US012689246B2

(12) United States Patent
Dow

(10) Patent No.: US 12,689,246 B2
(45) Date of Patent: Jul. 21, 2026

(54) WIRELESS CHARGING METHOD FOR URBAN AIR MOBILITY AND DEVICE AND SYSTEM THEREFOR

(71) Applicant: HYUNDAI MOBIS CO., LTD., Seoul (KR)

(72) Inventor: Young Soo Dow, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 911 days.

(21) Appl. No.: 17/899,979

(22) Filed: Aug. 31, 2022

(65) Prior Publication Data

US 2023/0166867 A1 Jun. 1, 2023

(30) Foreign Application Priority Data

Nov. 30, 2021 (KR) ........................ 10-2021-0168907

(51) Int. Cl.
H02J 50/90 (2016.01)
B60L 53/12 (2019.01)
(Continued)

(52) U.S. Cl.
CPC .............. H02J 50/90 (2016.02); B60L 53/12 (2019.02); B64C 39/024 (2013.01); H02J 50/10 (2016.02);
(Continued)

(58) Field of Classification Search
CPC ................................. H02J 50/90; B60L 53/36
(Continued)

(56) References Cited

U.S. PATENT DOCUMENTS 9,927,809 B1 * 3/2018 Tofte ...................... G06Q 40/08
2015/0371771 A1 * 12/2015 Abu Qahouq ......... H04B 5/263
307/104
(Continued)

FOREIGN PATENT DOCUMENTS

CN 107054108 A 8/2017
CN 108137154 A 6/2018
(Continued)

OTHER PUBLICATIONS

Extended European Search Report issued in corresponding European Patent Application No. 22198996.5 dated May 8, 2023.
(Continued)

*Primary Examiner* — Ahmed H Omar
(74) *Attorney, Agent, or Firm* — Morgan Lewis & Bockius LLP

(57) ABSTRACT

The present disclosure relates to an in-place alignment method for wireless charging of an urban air mobility and a device and a system therefor. A wireless charging method includes acquiring location information of a supply device for supplying wireless power, moving an urban air mobility to the supply device based on the location information, performing pairing with a user equipment (UE) based on a distance from the urban air mobility to the supply device, aligning a wireless power receiving pad of the urban air mobility and a wireless power transmitting pad of the supply device based on a control signal of the paired UE, and charging a battery of the urban air mobility by receiving wireless power from the supply device. The present disclosure maximizes a wireless charging efficiency and minimizes a power waste by quickly and accurately aligning pads of the urban air mobility and the supply device.

14 Claims, 13 Drawing Sheets

(51) Int. Cl.

| | |
|---|---|
| B60L 53/35 | (2019.01) |
| B64C 39/02 | (2023.01) |
| H02J 50/10 | (2016.01) |
| H02J 50/80 | (2016.01) |
| B64C 29/00 | (2006.01) |
| B64U 50/19 | (2023.01) |

(52) U.S. Cl.
CPC ........... *H02J 50/80* (2016.02); *B60L 2200/10*
(2013.01); *B64C 29/0008* (2013.01); *B64U*
*50/19* (2023.01); *B64U 2201/20* (2023.01)

(58) Field of Classification Search
USPC ........................................................ 320/108
See application file for complete search history.

(56) References Cited

U.S. PATENT DOCUMENTS

2017/0111088 A1    4/2017  Seong et al.

2018/0237161 A1*    8/2018  Minnick ................ B64U 50/37
2018/0257502 A1*    9/2018  Park ......................... B60L 53/36
2018/0339599 A1*   11/2018  Iwamoto .............. B60L 53/126
2018/0375390 A1*   12/2018  Sieber ..................... B60L 53/22
2020/0130864 A1     4/2020  Brockers et al.
2022/0266708 A1*    8/2022  Sakai ................. G01C 21/3647

FOREIGN PATENT DOCUMENTS

| | | |
|---|---|---|
| CN | 108928247  A | 12/2018 |
| EP | 3 101 778  A1 | 12/2016 |

OTHER PUBLICATIONS

Office Action dated Dec. 10, 2025 issued in the corresponding Chinese Patent Application No. 202211214877.1 (Note: U.S. Pat. No. 9927809 B1, and U.S. Pat. No. 2018375390 A1 already submitted. ).

* cited by examiner

FIG.4

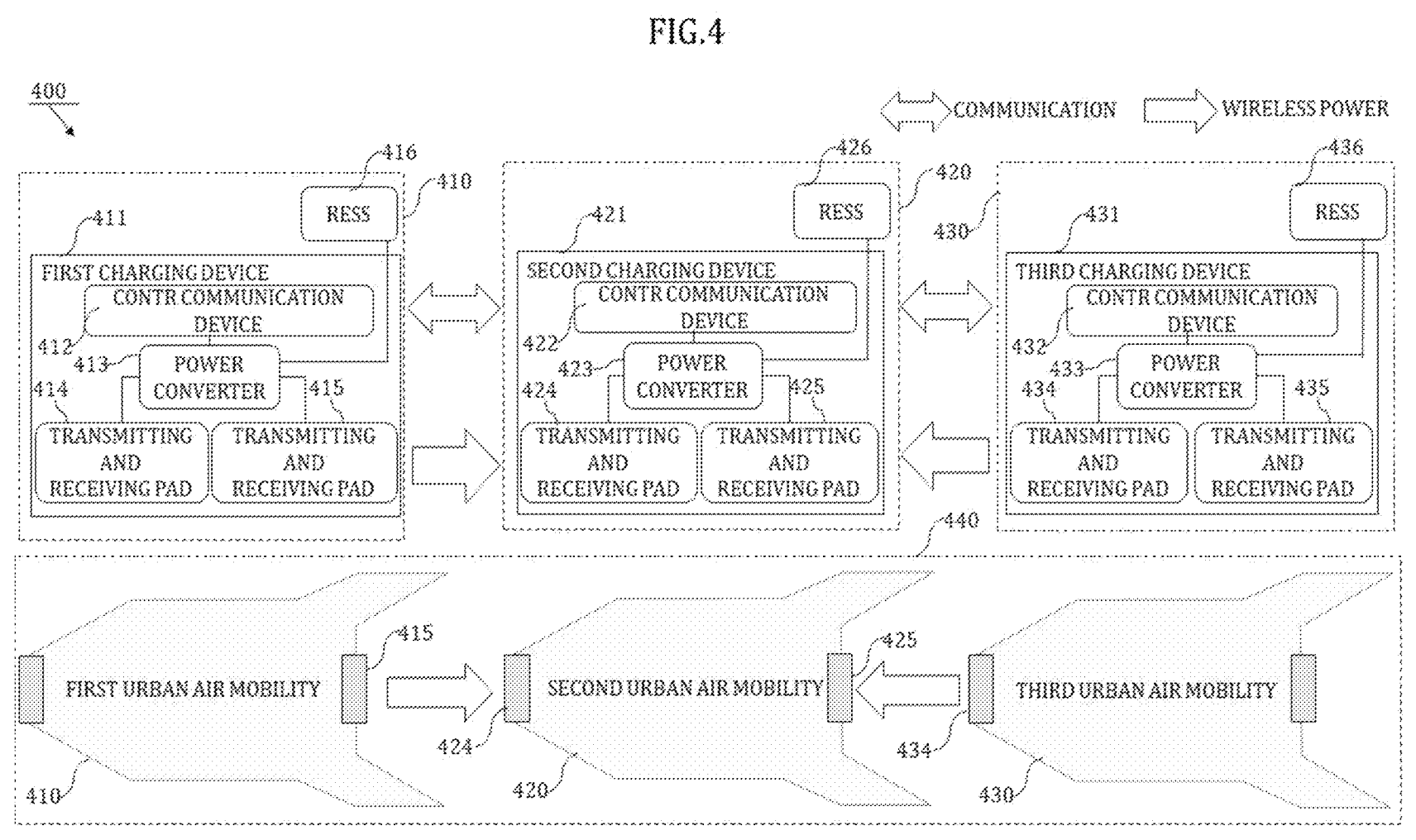

COMMUNICATION

WIRELESS POWER

THIRD CHARGING DEVICE

CONTR COMMUNICATION DEVICE — 431

432

POWER CONVERTER — 433

434 — TRANSMITTING AND RECEIVING PAD

TRANSMITTING AND RECEIVING PAD — 435

RESS — 436

430

420

440

SECOND CHARGING DEVICE

CONTR COMMUNICATION DEVICE — 421

422

POWER CONVERTER — 423

424 — TRANSMITTING AND RECEIVING PAD

TRANSMITTING AND RECEIVING PAD — 425

RESS — 426

410

FIRST CHARGING DEVICE

CONTR COMMUNICATION DEVICE — 411

412

POWER CONVERTER — 413

414 — TRANSMITTING AND RECEIVING PAD

TRANSMITTING AND RECEIVING PAD — 415

RESS — 416

400

THIRD URBAN AIR MOBILITY

435

434

425

430

SECOND URBAN AIR MOBILITY

424

420

415

FIRST URBAN AIR MOBILITY

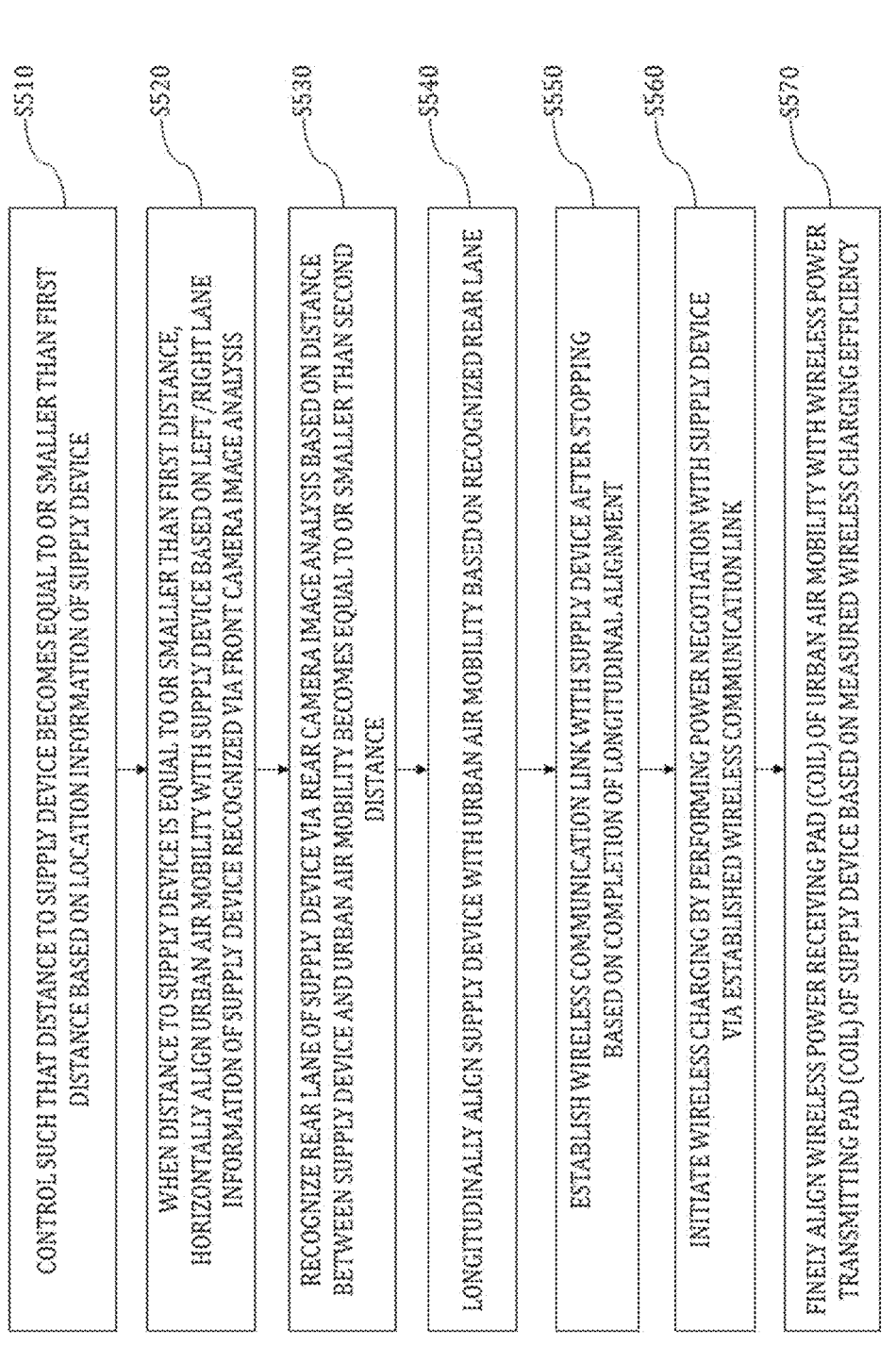

S510 — CONTROL SUCH THAT DISTANCE TO SUPPLY DEVICE BECOMES EQUAL TO OR SMALLER THAN FIRST DISTANCE BASED ON LOCATION INFORMATION OF SUPPLY DEVICE

S520 — WHEN DISTANCE TO SUPPLY DEVICE IS EQUAL TO OR SMALLER THAN FIRST DISTANCE, HORIZONTALLY ALIGN URBAN AIR MOBILITY WITH SUPPLY DEVICE BASED ON LEFT/RIGHT LANE INFORMATION OF SUPPLY DEVICE RECOGNIZED VIA FRONT CAMERA IMAGE ANALYSIS

S530 — RECOGNIZE REAR LANE OF SUPPLY DEVICE VIA REAR CAMERA IMAGE ANALYSIS BASED ON DISTANCE BETWEEN SUPPLY DEVICE AND URBAN AIR MOBILITY BECOMES EQUAL TO OR SMALLER THAN SECOND DISTANCE

S540 — LONGITUDINALLY ALIGN SUPPLY DEVICE WITH URBAN AIR MOBILITY BASED ON RECOGNIZED REAR LANE

S550 — ESTABLISH WIRELESS COMMUNICATION LINK WITH SUPPLY DEVICE AFTER STOPPING BASED ON COMPLETION OF LONGITUDINAL ALIGNMENT

S560 — INITIATE WIRELESS CHARGING BY PERFORMING POWER NEGOTIATION WITH SUPPLY DEVICE VIA ESTABLISHED WIRELESS COMMUNICATION LINK

S570 — FINELY ALIGN WIRELESS POWER RECEIVING PAD (COIL) OF URBAN AIR MOBILITY WITH WIRELESS POWER TRANSMITTING PAD (COIL) OF SUPPLY DEVICE BASED ON MEASURED WIRELESS CHARGING EFFICIENCY

FIG.6

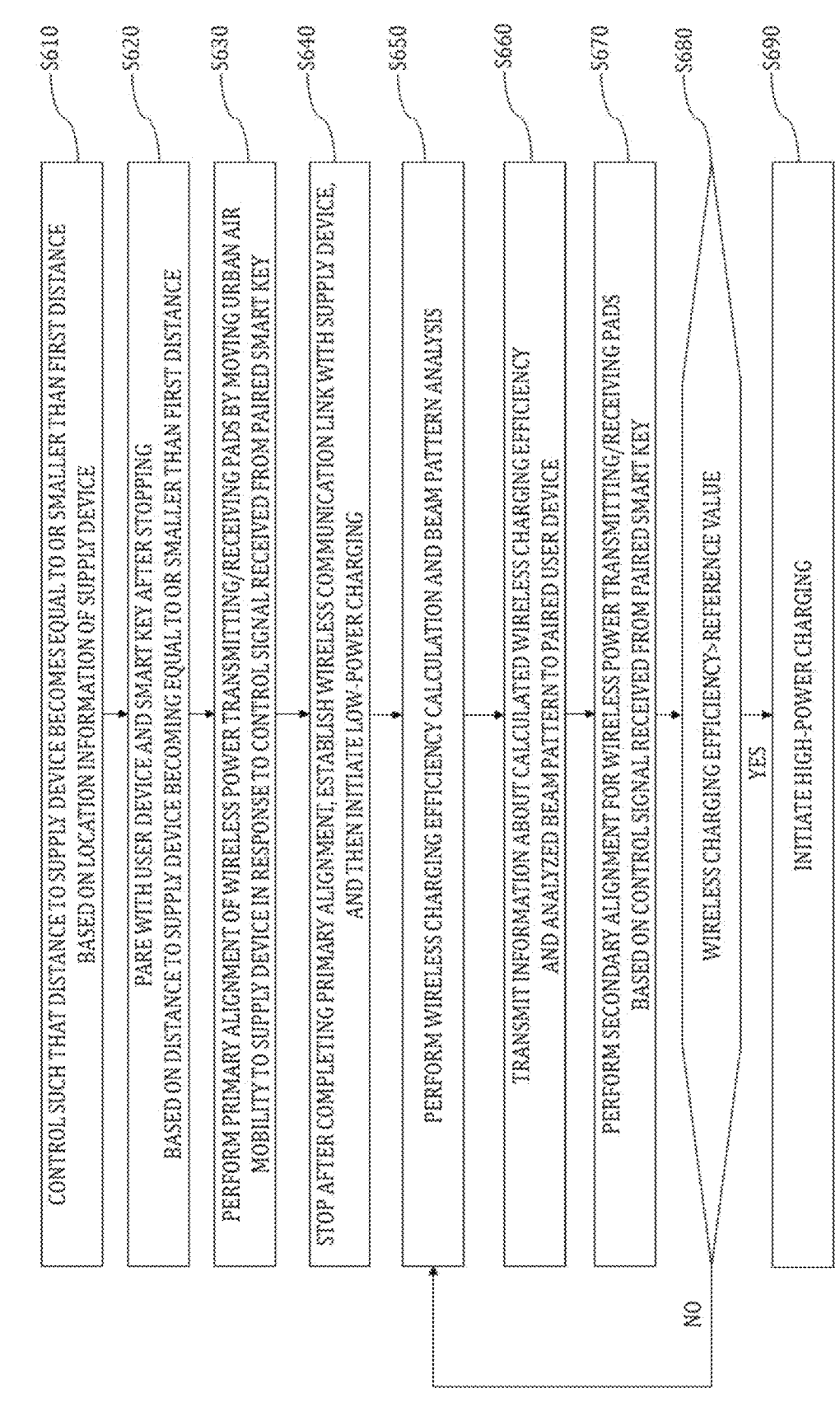

CONTROL SUCH THAT DISTANCE TO SUPPLY DEVICE BECOMES EQUAL TO OR SMALLER THAN FIRST DISTANCE BASED ON LOCATION INFORMATION OF SUPPLY DEVICE — S610

PARE WITH USER DEVICE AND SMART KEY AFTER STOPPING BASED ON DISTANCE TO SUPPLY DEVICE BECOMING EQUAL TO OR SMALLER THAN FIRST DISTANCE — S620

PERFORM PRIMARY ALIGNMENT OF WIRELESS POWER TRANSMITTING/RECEIVING PADS BY MOVING URBAN AIR MOBILITY TO SUPPLY DEVICE IN RESPONSE TO CONTROL SIGNAL RECEIVED FROM PAIRED SMART KEY — S630

STOP AFTER COMPLETING PRIMARY ALIGNMENT, ESTABLISH WIRELESS COMMUNICATION LINK WITH SUPPLY DEVICE, AND THEN INITIATE LOW-POWER CHARGING — S640

PERFORM WIRELESS CHARGING EFFICIENCY CALCULATION AND BEAM PATTERN ANALYSIS — S650

TRANSMIT INFORMATION ABOUT CALCULATED WIRELESS CHARGING EFFICIENCY AND ANALYZED BEAM PATTERN TO PAIRED USER DEVICE — S660

PERFORM SECONDARY ALIGNMENT FOR WIRELESS POWER TRANSMITTING/RECEIVING PADS BASED ON CONTROL SIGNAL RECEIVED FROM PAIRED SMART KEY — S670

WIRELESS CHARGING EFFICIENCY>REFERENCE VALUE — S680

NO

YES

INITIATE HIGH-POWER CHARGING — S690

FIG.7

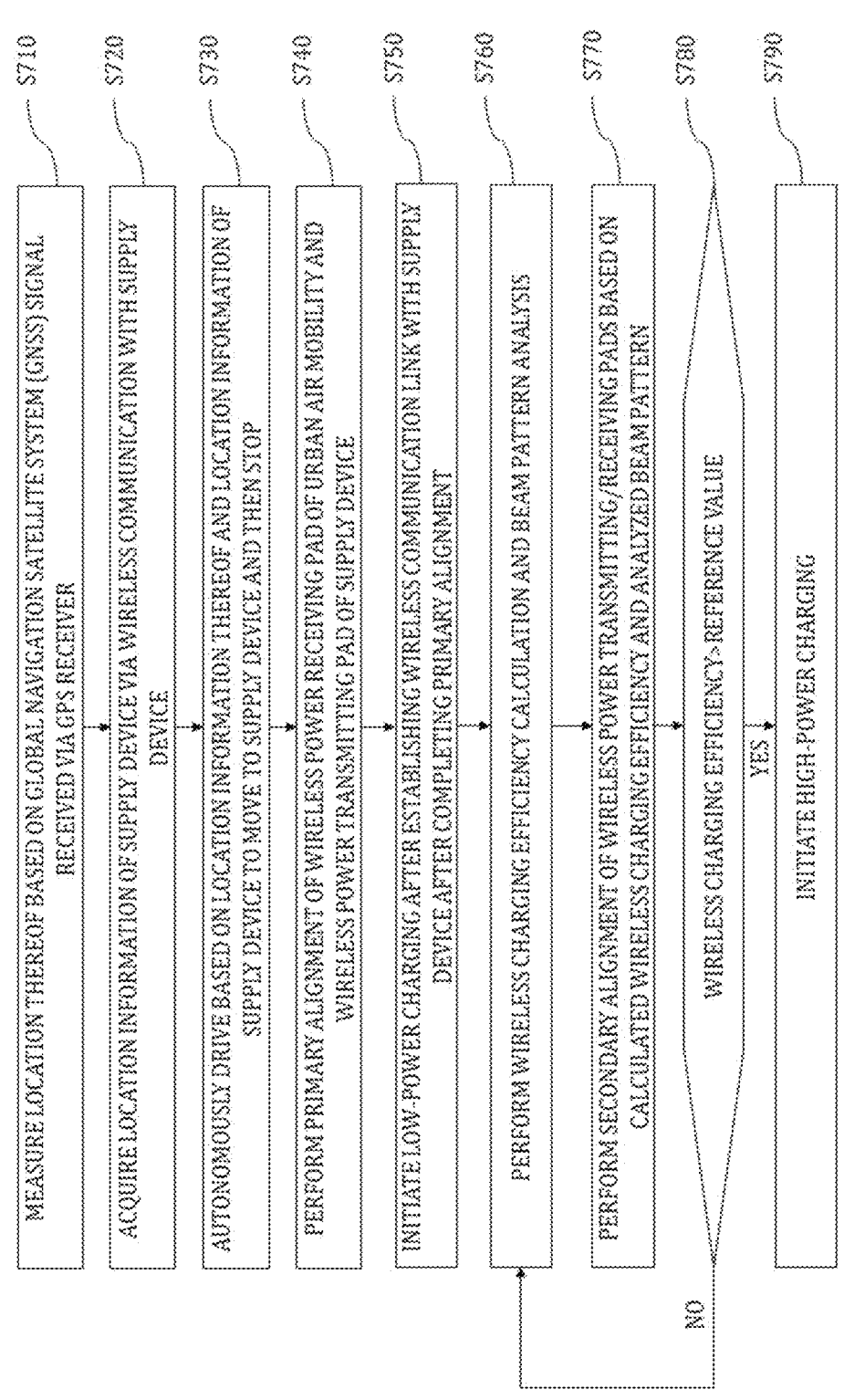

S710 — MEASURE LOCATION THEREOF BASED ON GLOBAL NAVIGATION SATELLITE SYSTEM (GNSS) SIGNAL RECEIVED VIA GPS RECEIVER

S720 — ACQUIRE LOCATION INFORMATION OF SUPPLY DEVICE VIA WIRELESS COMMUNICATION WITH SUPPLY DEVICE

S730 — AUTONOMOUSLY DRIVE BASED ON LOCATION INFORMATION THEREOF AND LOCATION INFORMATION OF SUPPLY DEVICE TO MOVE TO SUPPLY DEVICE AND THEN STOP

S740 — PERFORM PRIMARY ALIGNMENT OF WIRELESS POWER RECEIVING PAD OF URBAN AIR MOBILITY AND WIRELESS POWER TRANSMITTING PAD OF SUPPLY DEVICE

S750 — INITIATE LOW-POWER CHARGING AFTER ESTABLISHING WIRELESS COMMUNICATION LINK WITH SUPPLY DEVICE AFTER COMPLETING PRIMARY ALIGNMENT

S760 — PERFORM WIRELESS CHARGING EFFICIENCY CALCULATION AND BEAM PATTERN ANALYSIS

S770 — PERFORM SECONDARY ALIGNMENT OF WIRELESS POWER TRANSMITTING/RECEIVING PADS BASED ON CALCULATED WIRELESS CHARGING EFFICIENCY AND ANALYZED BEAM PATTERN

S780 — WIRELESS CHARGING EFFICIENCY>REFERENCE VALUE

NO

YES

S790 — INITIATE HIGH-POWER CHARGING

FIG.8

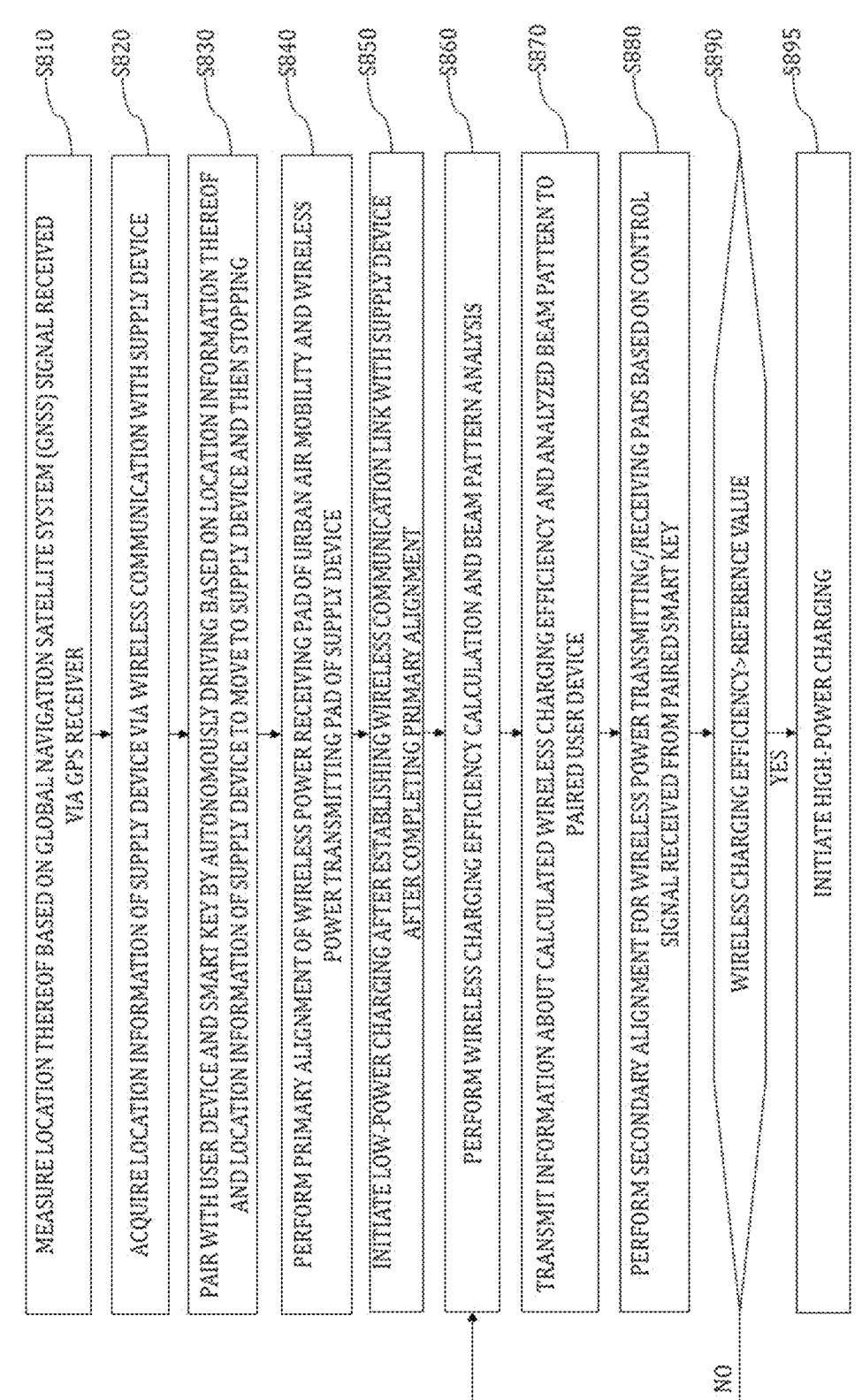

S810 — MEASURE LOCATION THEREOF BASED ON GLOBAL NAVIGATION SATELLITE SYSTEM (GNSS) SIGNAL RECEIVED VIA GPS RECEIVER

S820 — ACQUIRE LOCATION INFORMATION OF SUPPLY DEVICE VIA WIRELESS COMMUNICATION WITH SUPPLY DEVICE

S830 — PAIR WITH USER DEVICE AND SMART KEY BY AUTONOMOUSLY DRIVING BASED ON LOCATION INFORMATION THEREOF AND LOCATION INFORMATION OF SUPPLY DEVICE TO MOVE TO SUPPLY DEVICE AND THEN STOPPING

S840 — PERFORM PRIMARY ALIGNMENT OF WIRELESS POWER RECEIVING PAD OF URBAN AIR MOBILITY AND WIRELESS POWER TRANSMITTING PAD OF SUPPLY DEVICE

S850 — INITIATE LOW-POWER CHARGING AFTER ESTABLISHING WIRELESS COMMUNICATION LINK WITH SUPPLY DEVICE AFTER COMPLETING PRIMARY ALIGNMENT

S860 — PERFORM WIRELESS CHARGING EFFICIENCY CALCULATION AND BEAM PATTERN ANALYSIS

S870 — TRANSMIT INFORMATION ABOUT CALCULATED WIRELESS CHARGING EFFICIENCY AND ANALYZED BEAM PATTERN TO PAIRED USER DEVICE

S880 — PERFORM SECONDARY ALIGNMENT FOR WIRELESS POWER TRANSMITTING/RECEIVING PADS BASED ON CONTROL SIGNAL RECEIVED FROM PAIRED SMART KEY

S890 — WIRELESS CHARGING EFFICIENCY>REFERENCE VALUE

NO

YES

S895 — INITIATE HIGH-POWER CHARGING

FIG.9A

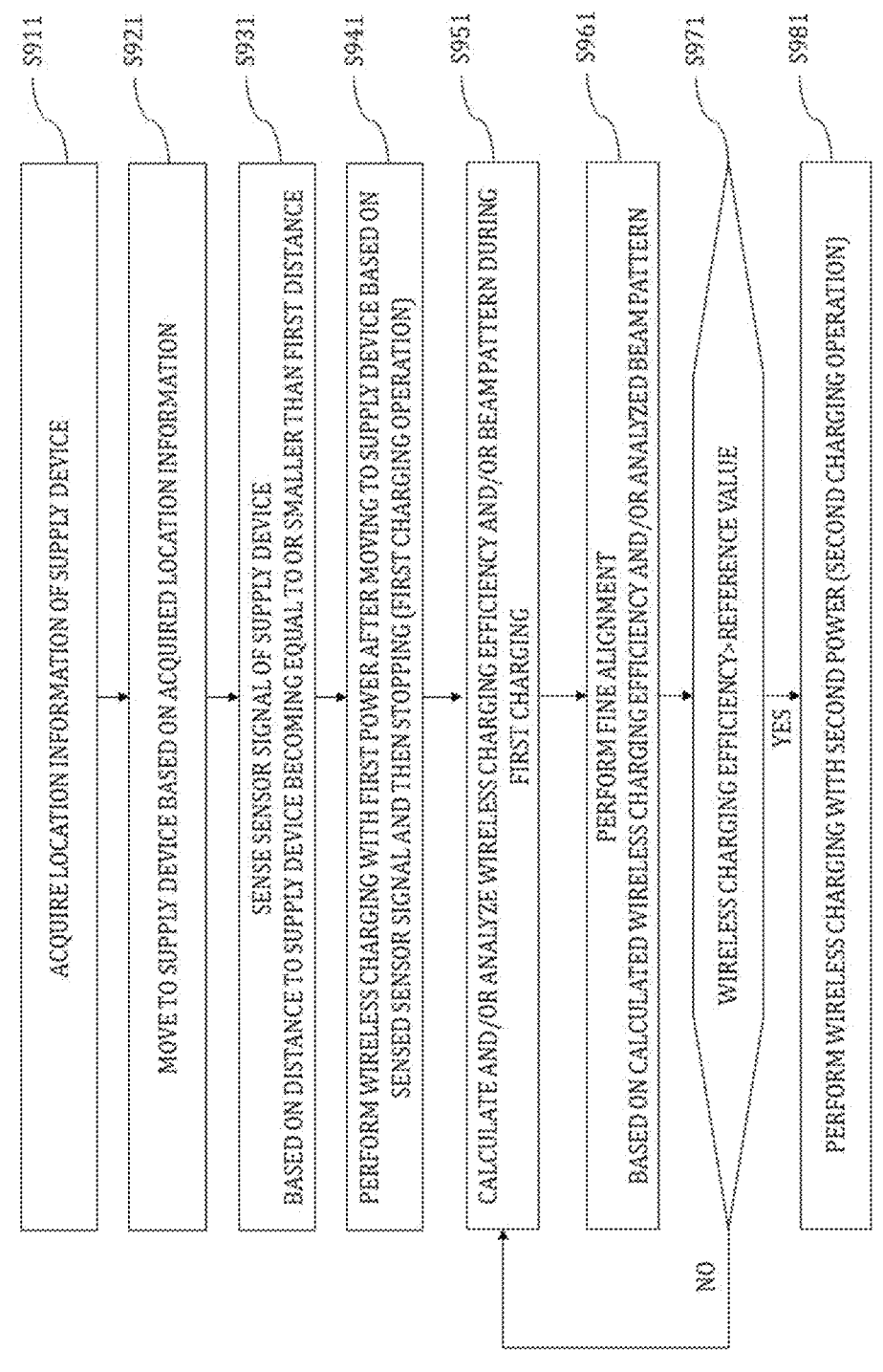

S911 ACQUIRE LOCATION INFORMATION OF SUPPLY DEVICE

S921 MOVE TO SUPPLY DEVICE BASED ON ACQUIRED LOCATION INFORMATION

S931 SENSE SENSOR SIGNAL OF SUPPLY DEVICE

S941 PERFORM WIRELESS CHARGING WITH FIRST POWER AFTER MOVING TO SUPPLY DEVICE BASED ON SENSED SENSOR SIGNAL AND THEN STOPPING (FIRST CHARGING OPERATION) BASED ON DISTANCE TO SUPPLY DEVICE BECOMING EQUAL TO OR SMALLER THAN FIRST DISTANCE

S951 CALCULATE AND/OR ANALYZE WIRELESS CHARGING EFFICIENCY AND/OR BEAM PATTERN DURING FIRST CHARGING

S961 PERFORM FINE ALIGNMENT BASED ON CALCULATED WIRELESS CHARGING EFFICIENCY AND/OR ANALYZED BEAM PATTERN

S971 WIRELESS CHARGING EFFICIENCY>REFERENCE VALUE
NO
YES

S981 PERFORM WIRELESS CHARGING WITH SECOND POWER (SECOND CHARGING OPERATION)

Figure 10:
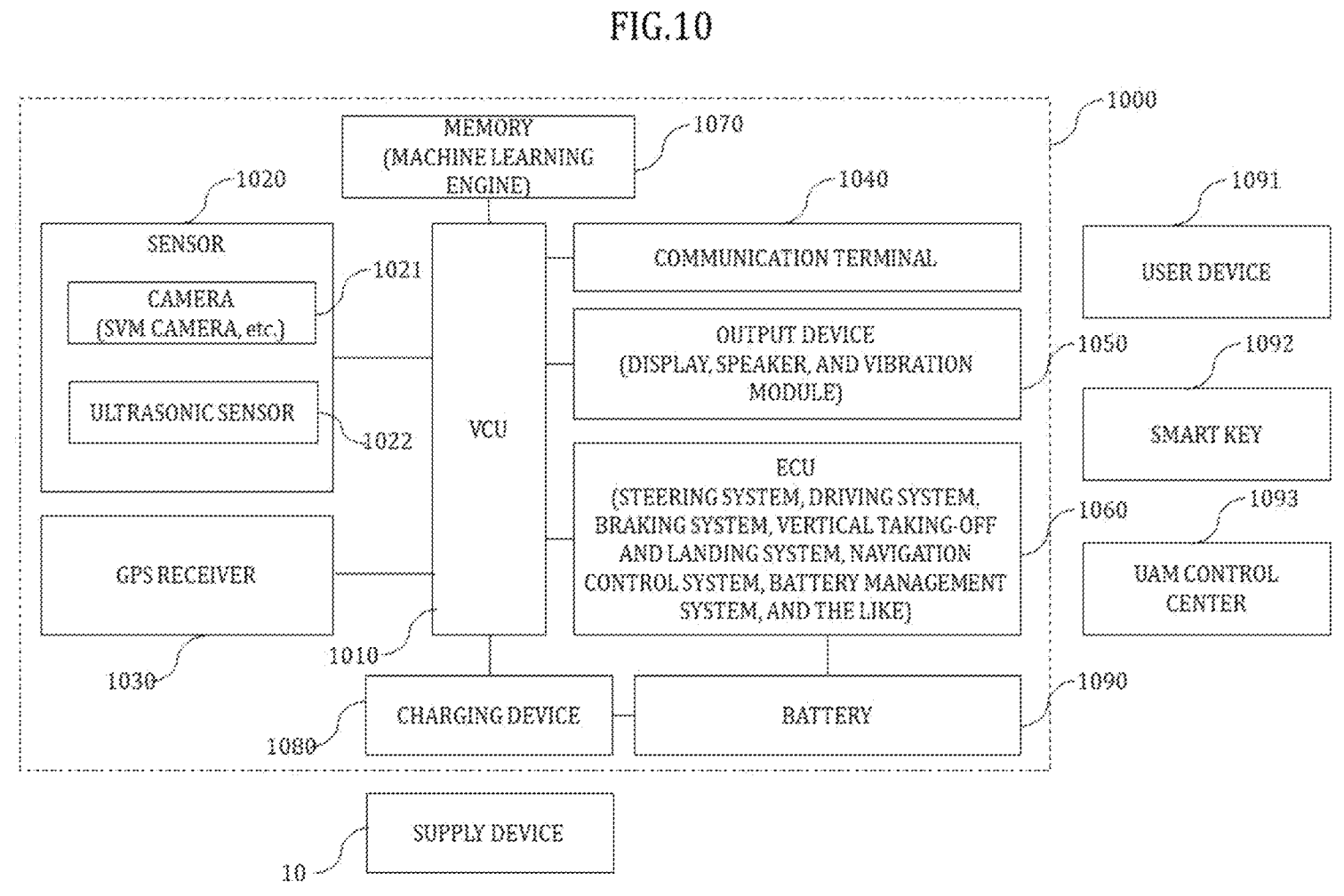

1070 MEMORY (MACHINE LEARNING ENGINE)

1040 COMMUNICATION TERMINAL

1050 OUTPUT DEVICE (DISPLAY, SPEAKER, AND VIBRATION MODULE)

ECU (STEERING SYSTEM, DRIVING SYSTEM, BRAKING SYSTEM, VERTICAL TAKING-OFF AND LANDING SYSTEM, NAVIGATION CONTROL SYSTEM, BATTERY MANAGEMENT SYSTEM, AND THE LIKE)

1090 BATTERY

VCU

1020 SENSOR

1021 CAMERA (SVM CAMERA, etc.)

1022 ULTRASONIC SENSOR

1030 GPS RECEIVER

1010 CHARGING DEVICE

1080

10 SUPPLY DEVICE

1091 USER DEVICE

1092 SMART KEY

1093 UAM CONTROL CENTER

Figure 12:
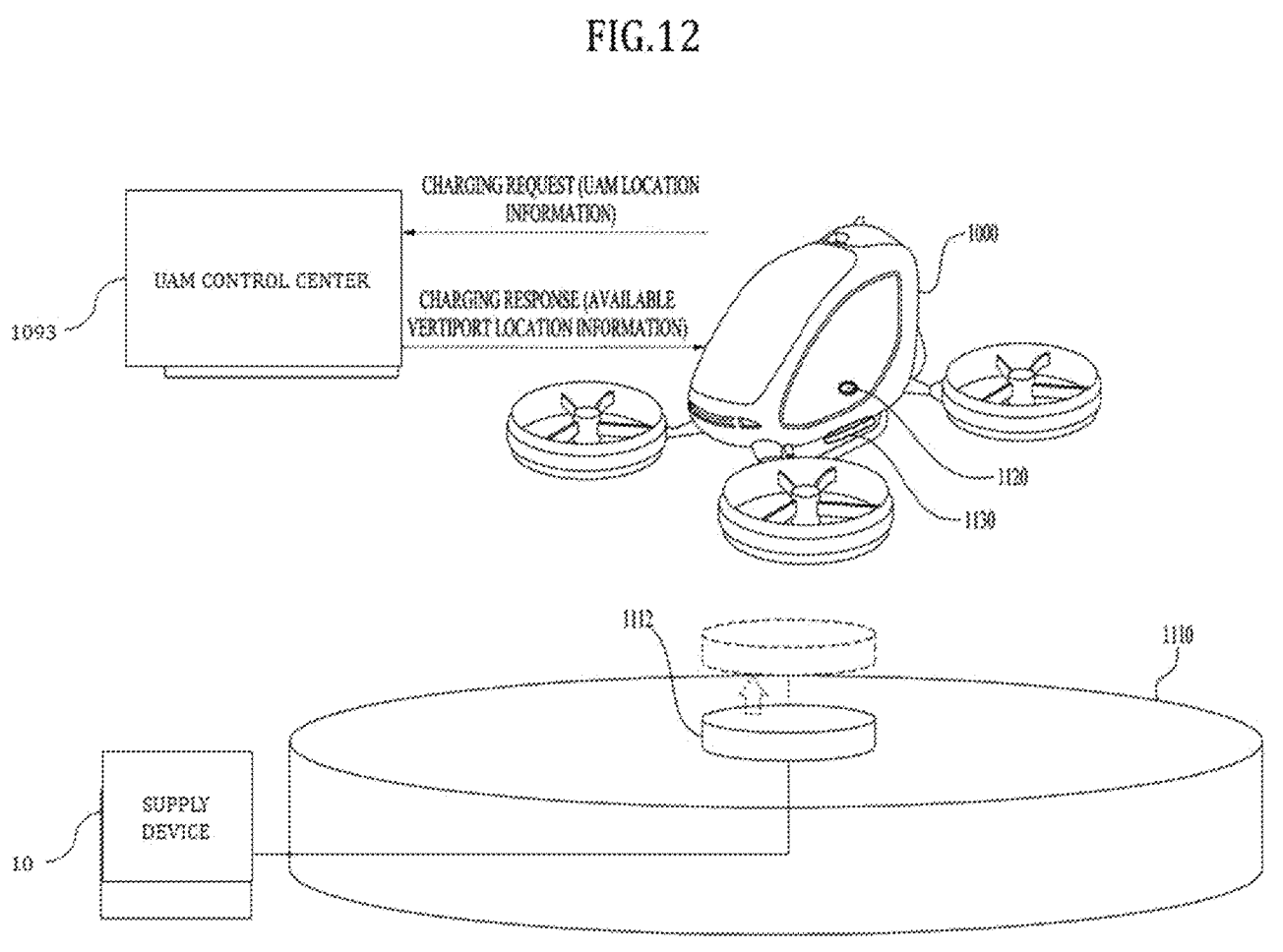

CHARGING REQUEST (UAM LOCATION INFORMATION)

CHARGING RESPONSE (AVAILABLE VERTIPORT LOCATION INFORMATION)

UAM CONTROL CENTER

1093

100

120

130

110

112

SUPPLY DEVICE

10

WIRELESS CHARGING METHOD FOR URBAN AIR MOBILITY AND DEVICE AND SYSTEM THEREFOR

Pursuant to 35 U.S.C. § 119(a), this application claims the benefit of Korean Patent Application No. 10-2021-0168907, filed on Nov. 30, 2021, which is hereby incorporated by reference as if fully set forth herein.

BACKGROUND

Field

The present disclosure relates to a wireless charging technology for an urban air mobility, and more particularly, to a technology for aligning a wireless power transceiver in place for wireless charging of the urban air mobility.

Discussion of the Related Art

A concept of an urban air mobility (UAM) was first defined by National Aeronautics & Space Administration (NASA) as "safe and efficient air traffic operation in a metropolitan region for manned and unmanned aerial vehicle systems". In recent years, a growing interest in the UAM by governments, businesses, and research institutions has led to rapid proliferation of such new concept.

According to a market report by Global Information, Inc., a market size of the urban air mobility (UAM) is projected to grow from $2.6 billion in 2020 to $9.1 billion in 2030, expanding at a compound annual growth rate (CAGR) of 13.5%. Factors such as an efficiency improvement, a safety for people, an increase in an investment demand are expected to drive the market growth.

The UAM is expected to revolutionize conventional modes of transport, including a highway, a railroad, and air and waterways. A 2018 Morgan Stanley blue paper estimates that a global UAM addressable market will reach $1.5 trillion by 2040.

The UAM concept may be further extended to an application in a rural region where conventional ground transportation infrastructures are insufficient. In particular, in addition to the transport sector, the UAM vehicle is expected to be applied in specific scenarios such as tourism, industry, emergency medical services, and fire control.

In the future, a smart UAM vehicle may be equipped with an autonomous driving function and a remote control function to eliminate a need for a pilot on board. This may not only eliminate needs for the pilot on board and a related cost, but also avoid a risk of a safety accident caused by a human error, and control the vehicle from the ground more easily and safely.

The UAM vehicle is a flying vehicle that transports passengers or cargo along a specific point-to-point route within an urban region. Due to constraints of buildings, factories, road traffic, and urban crowds, unlike aircraft using a conventional runway, an ideal vehicle model should be autonomous, compact, efficient, agile, and maneuverable with a function taking off and landing vertically.

In addition, an electrically-driven UAM vehicle is environmentally friendly and has an advantage of no exhaust gas using eco-friendly energy such as solar power, electric energy, hydrogen fuel, and the like instead of conventional fossil fuel in consideration of an atmospheric environmental issue.

The UAM vehicle has an advantage of being faster and more efficient than conventional ground transportation in that individuals and the cargo may move from city to city along a straight air route.

A centralized UAM platform provides a convenient network, eliminating a need for the individuals to own their own UAM vehicle. This may not only increase asset utilization, but also reduce wastage of resources.

In addition, the centralized UAM platform may eliminate a parking problem that dominates many portions of city life today, and may realize a true sharing economy compared to a conventional vehicle.

The UAM may provide short-distance (3 km-100 km) air service, and may be designed for city dwellers to effectively solve a "last 50 km" problem that airlines are not able to currently provide.

In order to efficiently operate the electrically-driven UAM vehicle, a safe and efficient charging scheme is required.

In particular, in a case of an unmanned UAM vehicle, a wireless charging scheme may be applied. In this regard, correct alignment between a wireless power receiver mounted in the UAM vehicle and a wireless power transmitter installed in a charging infrastructure is very important to improve a wireless charging efficiency.

SUMMARY

An object of the present disclosure is to provide a wireless charging method for an urban air mobility, and a device and a system therefor.

Another object of the present disclosure is to provide a method for aligning a wireless power transceiver for efficient wireless charging of an urban air mobility, and a device and a system therefor.

Another object of the present disclosure is to provide a method for aligning a wireless power transmitting/receiving pad using various sensors for efficient wireless charging of an electrically-driven urban air mobility, and a device and a system therefor.

Another object of the present disclosure is to provide a method for aligning a wireless power transmitting/receiving pad by adaptively selecting and driving a sensor based on a state of sensors equipped in an electrically-driven urban air mobility, and a device and a system therefor.

Another object of the present disclosure is to provide a method for aligning a wireless power transceiver by associating an urban air mobility with a user device(s), and a device and a system therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

A wireless charging method in an urban air mobility according to one aspect may include acquiring location information of a supply device for supplying wireless power, moving the urban air mobility to the supply device based on the location information, performing pairing with a user equipment (UE) based on a distance from the urban air mobility to the supply device, aligning a wireless power receiving pad of the urban air mobility and a wireless power transmitting pad of the supply device based on a control signal of the paired UE, and charging a battery of the urban air mobility by receiving wireless power from the supply device based on completion of the alignment.

In one implementation, the UE may include a smart key, wherein the alignment is performed based on the control signal received from the smart key of the paired UE.

In one implementation, the control signal may be received from the smart key through frequency communication.

In one implementation, the smart key may include at least one of a forward movement button, a backward movement button, a left movement button, a right movement button, and a stop button of the urban air mobility.

In one implementation, the aligning may include a primary alignment performing an alignment between the wireless power receiving pad of the urban air mobility and the wireless power transmitting pad of the supply device based on the control signal received from a smart key of the paired UE without transmitting information to the paired UE for the alignment, and the method may further include stopping the urban air mobility after completing the primary alignment, establishing a wireless communication link between the urban air mobility and the supply device, and initiating low-power charging.

In one implementation, the UE may further include a user device. The method may further include calculating wireless charging efficiency during the low-power charging, transmitting information related to the calculated wireless charging efficiency to the user device, and performing a fine alignment between the wireless power receiving pad and the wireless power transmitting pad based on the control signal received from the smart key in response to the transmitted information related to the calculated wireless charging efficiency.

In one implementation, the method may further include completing the fine alignment based on the calculated wireless charging efficiency exceeding a predetermined value, performing high-power charging based on the fine alignment being completed, and charging the battery of the urban air mobility using wireless power received during the high-power charging.

In one implementation, first power required for driving a charging device equipped in the urban air mobility may be received from the supply device during the low-power charging, and second power required for charging the battery of the urban air mobility may be received from the supply device during the high-power charging.

In one implementation, the method may further include analyzing a beam pattern based on wireless power received from the supply device during the low-power charging, transmitting information related to the analyzed beam pattern to the user device, and performing a fine alignment between the wireless power receiving pad and the wireless power transmitting pad based on the control signal received from the smart key in response to the transmitted information related to the analyzed beam pattern.

In one implementation, the location information of the supply device may be received from the supply device or an urban air mobility control center for managing the supply device via wireless communication in response to a charging request of the urban air mobility, wherein the location information includes GPS coordinate information of the supply device.

In a non-transitory computer readable storage medium for storing at least one computer program including an instruction that, when executed by at least one processor, causes the at least one processor to perform wireless charging operations in an urban air mobility in association with a supply device via wireless communication, wherein the operations may include acquiring location information of the supply device for supplying wireless power, moving the urban air mobility to the supply device based on the location information, performing pairing with a user equipment (UE) based on a distance from the urban air mobility to the supply device, aligning a wireless power receiving pad of the urban air mobility and a wireless power transmitting pad of the supply device based on a control signal of the paired UE, and charging a battery of the urban air mobility by receiving wireless power from the supply device based on completion of the alignment.

An urban air mobility equipped with a wireless charging function according to another aspect may include a communication terminal for performing communication with an external device, an electronic controller for controlling operation and movement of the urban air mobility, a rechargeable battery, a charging device for converting power received via a wireless power receiving pad to charge the battery, and a vehicle controller for controlling the communication terminal and the charging device. The vehicle control unit is configured to acquire location information of a supply device for supplying wireless power via the communication terminal, control the electronic controller based on the location information to move the urban air mobility to the supply device, perform pairing with a user equipment (UE) based on a distance from the urban air mobility to the supply device, perform an alignment of a wireless power receiving pad of the urban air mobility and a wireless power transmitting pad of the supply device based on a control signal of the paired UE, and control the charging device to perform wireless charging, after completion of the alignment.

In one implementation, the UE may include a smart key, wherein the vehicle controller is configured to control the electronic controller to perform the alignment based on the control signal received from the smart key of the paired UE.

In one implementation, the control signal may be received through frequency communication.

In one implementation, the smart key may include at least one of a forward movement button, a backward movement button, a left movement button, a right movement button, and a stop button of the urban air mobility.

In one implementation, the alignment may include a primary alignment performing an alignment between the wireless power receiving pad of the urban air mobility and the wireless power transmitting pad of the supply device based on the control signal received from a smart key of the paired UE without transmitting information to the paired UE for the alignment. The vehicle controller is configured to stop the urban air mobility after completing the primary alignment, establish a wireless communication link between the urban air mobility and the supply device, and initiate low-power charging.

In one implementation, the UE may further include a user device. The vehicle controller is configured to transmit information related to wireless charging efficiency calculated during the low-power charging to the user device, and perform fine alignment between the wireless power receiving pad and the wireless power transmitting pad based on the control signal received from the smart key in response to the transmitted information related to the calculated wireless charging efficiency.

In one implementation, the vehicle controller may be configured to complete the fine alignment based on the wireless charging efficiency exceeding a predetermined value, initiate high-power charging by interacting with the supply device based on the completion of the fine alignment, and charge the battery using wireless power received during the high-power charging.

In one implementation, first power required for driving the charging device may be received during the low-power charging, and second power required for charging the battery may be received during the high-power charging, wherein the second power is greater than the first power.

In one implementation, the UE may further include a user device and the vehicle controller is further configured to perform a second alignment. wherein the second alignment may comprise to analyze a beam pattern based on wireless power received from the supply device during the low-power charging, transmit information related to the analyzed beam pattern to the user device, and perform fine alignment between the wireless power receiving pad and the wireless power transmitting pad based on the control signal received from the smart key in response to the transmitted information related to the analyzed beam pattern.

In one implementation, the location information of the supply device may be received from the supply device or an urban air mobility control center for managing the supply device via wireless communication in response to a charging request of the urban air mobility, wherein the location information includes GPS coordinate information of the supply device.

A wireless charging system according to another aspect may include a supply device for supplying wireless power, and an urban air mobility for receiving the wireless power from the supply device through a charging device included therein, and charging a battery included therein, wherein location information of the supply device is acquired via a communication terminal equipped with the urban air mobility, wherein an equipped electronic controller is controlled based on the location information to move the urban air mobility to the supply device, wherein pairing of a user equipment (UE) is performed based on a distance to the supply device, wherein a wireless power transmitting pad provided in the supply device and a wireless power receiving pad provided in the charging device are aligned based on a control signal of the paired UE, and wherein the charging device is controlled to perform wireless charging after completion of the alignment.

The above-described aspects of the present disclosure are merely some of the preferred embodiments of the present disclosure, and various embodiments reflecting the technical features of the present disclosure may be derived and understood by those skilled in the art based on the following detailed description of the disclosure.

The present disclosure has an advantage of providing the wireless charging method for the urban air mobility, and the device and the system therefor.

In addition, the present disclosure has an advantage of providing the method for aligning the wireless power transceiver for the efficient wireless charging of the urban air mobility, and the device and the system therefor.

In addition, the present disclosure has an advantage of providing the method for aligning the wireless power transmitting/receiving pad using the various sensors mounted in the charging infrastructure and the electrically-driven urban air mobility, and the device and the system therefor.

In addition, the present disclosure has an advantage of providing the method for aligning the wireless power transmitting/receiving pad by adaptively selecting and driving the sensor based on the state of the sensors equipped in the electrically-driven urban air mobility, and the device and the system therefor.

In addition, the present disclosure has an advantage of providing the method for aligning the wireless power transceiver by associating the urban air mobility with the user device(s), and the device and the system therefor.

In addition, various effects that can be directly or indirectly identified through this document may be provided.

BRIEF DESCRIPTION OF THE DRAWINGS

The accompanying drawings, which are included to provide a further understanding of the disclosure, provide various embodiments of the present disclosure and illustrate principles of the present disclosure together with detail explanation.

FIG. 4 is a diagram for illustrating a method for configuring a wireless charging chain between urban air mobilities during flight according to an embodiment.

FIGS. 5 to 9B are flowcharts for illustrating an in-place alignment method for wireless charging of an urban air mobility according to various embodiments.

FIG. 10 is a block diagram for illustrating a configuration of an urban air mobility according to an embodiment.

FIG. 11 is a diagram for illustrating an in-place alignment method for wireless charging of an urban air mobility according to an embodiment.

FIG. 12 is a diagram for illustrating an in-place alignment method for wireless charging of an urban air mobility capable of vertical take-off and landing according to an embodiment of the present disclosure.

DESCRIPTION OF SPECIFIC EMBODIMENTS

Figure 1:
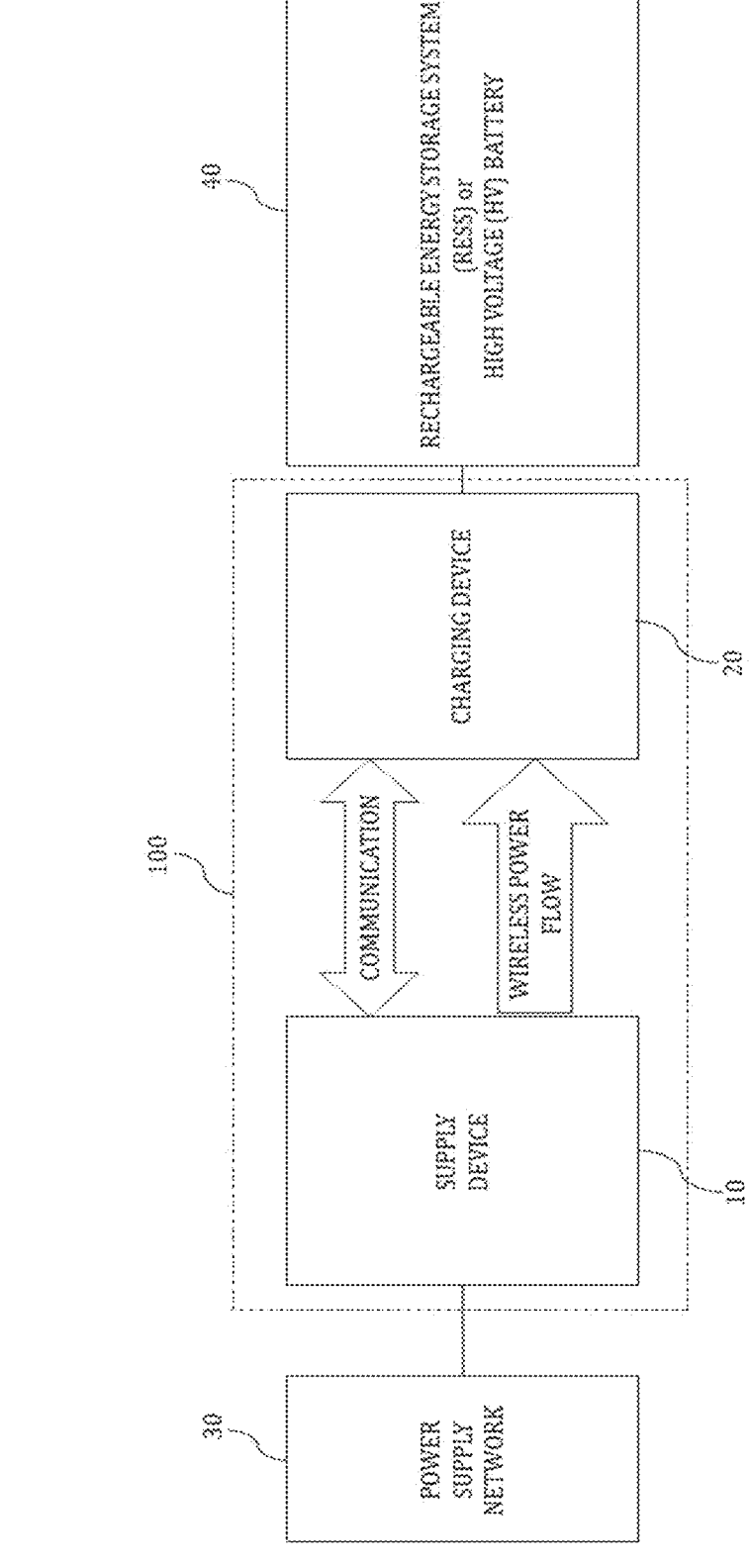
FIG. 1 is a diagram for illustrating an overall structure of a wireless power transmitting system according to an embodiment.

Hereinafter, some embodiments of the present disclosure will be described in detail with reference to the accompanying drawings. It should be noted that, in adding reference numerals to the constituent elements in the respective drawings, like reference numerals will be used throughout the drawings to refer to the same or like elements. Further, in the following description of embodiments of the present disclosure, a detailed description of known functions and configurations incorporated herein will be omitted to avoid obscuring the subject matter of the embodiments.

In describing the components of the embodiments of the present disclosure, various terms such as first, second, A, B, (a), (b), etc., may be used solely for the purpose of differentiating one component from another, but the essence, order or sequence of the components are not limited to these terms. Unless defined otherwise, all terms, including technical and scientific terms, used in the present disclosure may have the same meaning as commonly understood by a person having ordinary skill in the art to which the present disclosure pertains. It will be further understood that terms, such as those defined in commonly used dictionaries, may be interpreted as having a meaning that is consistent with their meaning in the context of the related art and the present disclosure, and may not be interpreted in an idealized or overly formal sense unless expressly so defined herein.

In various embodiments of the present disclosure, "I" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Hereinafter, embodiments of the present disclosure will be described in detail with reference to FIGS. 1 to 12.

FIG. 1 is a diagram illustrating the overall structure of a wireless power transmission system according to an embodiment.

Referring to FIG. 1, a wireless power transmission system 100 may include a supply device 10 and a charging device 20.

The supply device 10 may convert AC (or DC) electrical energy supplied from a power supply network 30 into AC electrical energy required by the charging device 20, and then transmit the converted AC electrical energy to the charging device 20 using a predetermined wireless energy transmission method. Here, the wireless energy transmission method may include electromagnetic induction, electromagnetic resonance (or magnetic resonance), microwaves, and radio frequency (RF) wireless power transmission. The electromagnetic induction is a method of transferring energy using an induced electromotive force generated by a magnetic induction of AC power between the primary coil provided in the supply device 10 and the secondary coil provided in the charging device 20. On the other hand, in the method of electromagnetic resonance, when a magnetic field that vibrates at a specific resonant frequency is generated through the primary coil provided in the supply device 10, the charging device 20 induces a magnetic field in the secondary coil having the same resonant frequency to transfer energy. The RF wireless power transmission is a method of transmitting an RF wireless power signal to the receiver through beamforming using a phased array antenna system of the transmitter. This method may allow remote wireless charging up to a radius of several meters, compared to the conventional electromagnetic induction or electromagnetic resonance.

The supply device 10 and the charging device 20 may be interconnected through short-range wireless communication to exchange various kinds of information for wireless power transmission.

The charging device 20 may rectify the wireless power received from the supply device 10 and then supply the rectified power to the in-device—that is, on-board—rechargeable energy storage systems (RESS) or high voltage (HV) battery.

The supply device 10 according to the embodiment may be installed in a building, a road, a parking lot, a charging hub, or a vertiport, which is infrastructure for takeoff and landing of urban air mobility located on land, in the air, on water or on the roof of a building. When a wireless power transmission pad for wireless power transmission is mounted on the charging device 20, the charging device 20 may perform a function as a supply device. Thereby, wireless charging may be performed between the electrically powered devices 20.

For example, when the charging device 20 is equipped with multiple wireless power reception pads, the charging device 20 may receive wireless power from other multiple charging devices 20 equipped with a wireless power transmission pad at the same time to charge the battery.

As another example, when the charging device 20 is equipped with multiple wireless power transmission pads, the charging device 20 may transmit wireless power to other multiple charging devices 20 equipped with a wireless power reception pad to charge the multiple charging devices 20 at the same time. That is, when the charging device 20 is unable to move to the supply device 10 due to the current battery charge amount, it may be operatively connected to another nearby charging device 20 to perform charging between the charging devices 20. As an example, a charging device to supply wireless power and a charging device to receive the wireless power may be dynamically determined based on the current battery charge amount of the charging device 20.

The charging device 20 according to the embodiment may be mounted on various means of transportation. As an example, the charging device 20 may be applied to an electric vehicle, an unmanned drone, urban air mobility, multi-modal mobility (or hybrid air mobility) operating on land and in the air or on land and at sea.

In a following embodiment, a description will be made with an example in which the charging device 20 is mounted on the urban air mobility.

The charging device 20 according to an embodiment may be mounted at one side of a lower portion of the urban air mobility, but this is only one embodiment. Depending on a design of those skilled in the art, the charging device 20 may be mounted at one side of an upper portion of the urban air mobility, one side of a front portion, one side of a rear portion, and one side of a left/right portion.

The supply device 10 according to the embodiment may be operatively connected to other supply devices by a wired or wireless communication system.

The charging device 20 according to an embodiment may be associated with another charging device 20 via a wireless communication system. To this end, the charging device 20 may be connected to a communication terminal (not shown) disposed in the urban air mobility via a communication network inside the urban air mobility to exchange signals and information.

For example, the wireless communication system may be a multiple access system that supports communication with multiple users by sharing an available system resource (e.g., bandwidth, transmit power, etc.). Examples of the multiple access system may include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

The charging device 20 according to the embodiment may be connected to another supply device by wireless communication. As an example, the charging device 20 may be connected to multiple supply devices 10. In this case, the charging device 20 may receive wireless power from the supply devices 10 simultaneously. Based on the wireless charging efficiency between the charging device 20 and the supply devices 10, the charging device 20 may dynamically determine at least one supply device 10 to receive power.

In the above-described embodiment, it has been described that the supply device 10 and the charging device 20 to perform wireless charging are dynamically determined based on the wireless charging efficiency. However, this is merely one embodiment. The supply device 10 and the charging device 20 to perform wireless charging may be dynamically determined by further considering the type and capability of the supply device 10, the type and capability of the charging device 20, and the like. As an example, the type and capability of the charging device 20 may depend on the type of the transportation means on which the charging device 20 is mounted. Accordingly, the type and capability of the supply device 10 matching the charging device 20 may depend on the charging device 20.

The charging device 20 according to an embodiment may perform a function as a wireless power transmitting relay— hereinafter, for convenience of description, referred to as a relay or a relay node—that transmits power received from the supply device 10 to another charging device. In this case, the charging device 20 may include both a wireless power receiver (or a wireless power receiving pad) for receiving the wireless power and a wireless power transmitter (a wireless power transmitting pad) for transmitting the wireless power. In an embodiment, locations where the wireless power receiver and the wireless power transmitter are mounted on one urban air mobility may be different from each other, but this is only one embodiment. The wireless power receiver and the wireless power transmitter may be constructed as one module and mounted at a specific location. As an example, the wireless power receiving pad for receiving the power from the supply device 10 may be mounted at one side of the lower portion of the urban air mobility, and the wireless power transmitting/receiving pad for receiving the wireless power from another urban air mobility or transmitting the wireless power to another urban air mobility may be mounted at one side of the upper portion of the urban air mobility.

Through the above-described embodiments, the urban air mobility equipped with the charging device 20 according to the present disclosure may not only receive the wireless power from the supply device 10 to charge a battery thereof, but also transmit and receive the wireless power via collaboration with another urban air mobility stopped (or in flight). For example, when a battery charged level during the flight is not sufficient to fly to the nearest supply device 10 or when the urban air mobility deviates from a route due to unusual weather or the like, the corresponding urban air mobility may make a request for emergency air charging to another nearby urban air mobility (or a central control center).

As an example, when another nearby urban air mobility that has received the request for the emergency air charging is capable of the emergency air charging based on a battery charged state thereof, another nearby urban air mobility may move toward the urban air mobility that has requested the emergency air charging and supply the wireless power via the wireless charging during the flight.

As another example, the central control center (or an urban air mobility operator (UAM air operator)) who has received the request for the emergency air charging may search for another urban air mobility around the urban air mobility that has requested the emergency air charging, and determine a target to participate in the emergency air charging based on the current battery charged state of another searched urban air mobility. When the target to participate in the emergency air charging is determined, after transmitting a predetermined control signal to the nearby urban air mobility determined as the target to participate in the emergency air charging to guide the nearby urban air mobility to a location of the urban air mobility that has requested the emergency air charging, the central control center may control the nearby urban air mobility to perform the wireless charging during the flight.

The charging device 20 controls at least one switch provided in the wireless power transmission pad and the wireless power reception pad to activate/deactivate (ON/ OFF) the operation of the corresponding wireless power transmission pad and/or the wireless power reception pad.

In the above embodiment, the description has been made with the example in which the charging device 20 receives the wireless power from one supply device 10, but this is only one embodiment. The charging device 20 may include a plurality of wireless power receiving pads to simultaneously receive the wireless power from a plurality of supply devices 10 to perform fast charging.

In another embodiment, the charging device 20 may further include wired charging means as well as wireless charging means. In this case, the fast charging may be performed using at least one of the wireless charging means and the wired charging means.

A charging device 20 of a first urban air mobility according to an embodiment may divide the wireless power received from the supply device 10 via negotiation with a charging device 20 equipped in a second urban air mobility and transmit the divided wireless power to the second urban air mobility. As an example, amounts of power charged by the first urban air mobility and the second urban air mobility may be dynamically determined based on respective battery charged states of the urban air mobilities. As another example, the amounts of power charged by the first urban air mobility and the second urban air mobility may be dynamically determined based on respective flight reservation states as well as the respective battery charged states of the first urban air mobility and the second urban air mobility. That is, the longer the reserved flight distance corresponding to each urban air mobility, the more power consumption is expected. Therefore, it is necessary to further consider a flight plan, a flight distance, and the like for power distribution.

The charging device 20 according to an embodiment may determine whether power relay to another urban air mobility is available based on a battery charged state of a RESS 40 thereof. As an example, when the battery charged level (or a battery output voltage) of the first urban air mobility is equal to or higher than a predetermined reference value, the charging device 20 of the first urban air mobility may transmit the power received from the supply device 10 to the charging device 20 of the second urban air mobility. On the other hand, when the battery charged level (or the battery output voltage) of the first urban air mobility is lower than the predetermined reference value, the charging device 20 of the first urban air mobility may control such that the power received from the supply device 10 is not relayed to the charging device 20 of the second urban air mobility and used only for charging the RESS 40 thereof.

The communication terminal mounted on the urban air mobility may be connected to the supply device 10, another urban air mobility, the central control center, and the like via V2X (Vehicle to Everything) communication supported by 4G LTE/5G NR communication to exchange various information.

The urban air mobility may be equipped with a global positioning system (GPS) receiver to receive and decode a GPS satellite signal. The urban air mobility may obtain current GPS coordinate information from the GPS satellite signal and provide the GPS satellite signal to the supply device 10 and/or another urban air mobility via the communication terminal. In one example, the communication terminal mounted on the urban air mobility may acquire GPS coordinate information of the supply device 10 and/or another urban air mobility.

V2X refers to a communication technology for exchanging information with other vehicles, pedestrians, and infrastructure-built objects through wired/wireless communication. V2X may be divided into four types: vehicle-to-vehicle (V2V) for vehicle-to-vehicle communication; vehicle-to-infrastructure (V2I) for communication between a vehicle and infrastructure; vehicle-to-network (V2N) for communication between a vehicle and a communication network; and vehicle-to-pedestrian (V2P) for communication between a vehicle and a pedestrian. V2X communication may be provided via a PC5 interface and/or a Uu interface.

Sidelink (SL) is a communication scheme that establishes a direct wireless link between UAMs to enable direct exchange of information between the vehicle terminals without intervention of a base station (BS) or infrastructure (for example, RSU). SL is considered as a way to alleviate the burden on the BS according to the rapidly increasing amount of data traffic and to minimize the transmission delay in UAM-to-UAM communication FIG. 2 is a diagram for illustrating a detailed structure of a wireless charging system for an urban air mobility according to an embodiment.

Figure 2:
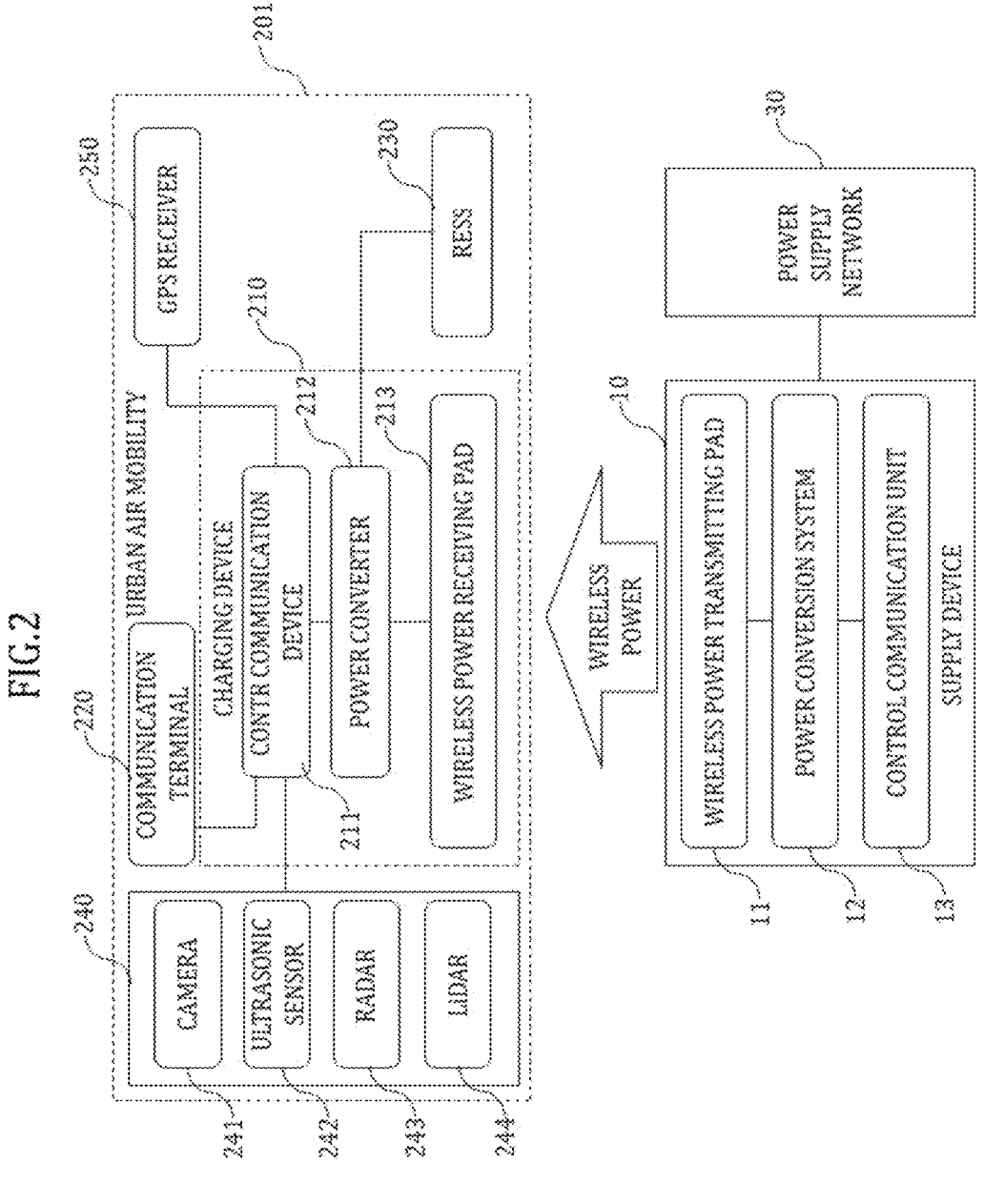
FIG. 2 is a diagram for illustrating a detailed structure of a wireless charging system for an urban air mobility according to an embodiment.

Referring to FIG. 2, a wireless charging system 200 for the urban air mobility may largely include a supply device 10, a power supply network 30, and a first urban air mobility 201.

In the embodiment in FIG. 2, wireless charging for one urban air mobility 201 is described as an example, but this is only one embodiment. The number of urban air mobilities 201 that may be simultaneously charged by the supply device 10 may be equal to or greater than two. The maximum number of urban air mobilities 201 that may be simultaneously charged corresponding to one supply device 10 may be dynamically determined by a maximum supplyable power of the supply device 10, required power of the urban air mobility 201 to be charged, and the like.

The supply device 10 may include a wireless power transmitting pad 11, a power conversion system 12, and a control communication device 13, but may not be limited thereto, and may further include a GPS receiver (not shown), an ultrasonic sensor (not shown), and the like.

The control communication device 13 may control overall operations and input/output of the supply device 10. In addition, the control communication device 13 may control the power conversion system 12 to convert power provided from the power supply network 30 to power required for charging the urban air mobility 201. In this regard, an AC power signal converted by the power conversion system 12 may be wirelessly transmitted via a transmission coil of the wireless power transmitting pad 11. The wireless power transmitted via the wireless power transmitting pad 11 may be transmitted to a wireless power receiving pad 213 via an electromagnetic induction phenomenon (or an electromagnetic resonance phenomenon).

In an embodiment, there may be a plurality of wireless power transmitting pads 11 equipped in the supply device 10 or one wireless power transmitting pad 11 may have a plurality of transmission coils for simultaneously charging the plurality of urban air mobility 201.

The supply device 10 according to an embodiment may further include the GPS receiver (not shown) and the ultrasonic sensor. The supply device 10 may provide GPS coordinate information thereof to the urban air mobility 201. In addition, the supply device 10 may receive sensor state information of the urban air mobility 201, and may drive the ultrasonic sensor based on the sensor state information of the urban air mobility 201. In this case, the urban air mobility 201 may sense an ultrasonic signal transmitted by the supply device 10 to identify a location of the supply device 10, and may move to the identified location and align the wireless power transmitting/receiving pad, and then, perform the wireless charging.

Referring to FIG. 2, the urban air mobility 201 may include at least one of a charging device 210, a communication terminal 220, a RESS 230, a sensor 240, and a GPS receiver 250. In this regard, the sensor 240 may include at least one of a camera 241, an ultrasonic sensor 242, a radar 243, and a light detection and ranging (LiDAR) 244. For example, the camera 241 may include at least one of a front camera, a rear camera, a left/right camera, an upper camera, and a lower camera. For example, the camera 241 may include at least one of a surround view monitor (SVM) camera, an RGB camera, and an infrared camera.

The charging device 210 may include a control communication device 211, a power converter 212, and a wireless power receiving pad 213.

The control communication device 211 may control input/output and overall operations of the charging device, and may perform communication with external device(s).

The control communication device 211 may communicate with various electric control units (ECUs) via an internal communication network of the urban air mobility 201. In this regard, the ECU may include a steering system for steering control, a braking system for controlling stopping and parking, a driving system for controlling driving of a motor for the flight, and the like, but the present disclosure may not be limited thereto. The internal communication network of the urban air mobility 201 may include a controller area network (CAN), a local interconnect network (LIN), a FlexRay, a media oriented systems transport (MOST) communication network, and the like, but the present disclosure may not be limited thereto.

In addition, the control communication device 211 may exchange various control signals and state information with the control communication device 13 of the supply device 10 via inband (or out-of-band) communication for receiving the wireless power reception. In this regard, the inband communication refers to a communication scheme using the same frequency band as a frequency band used for transmitting the wireless power. For example, IEEE 802.11p communication, 4G LTE communication, 5G NR (New Radio) millimeter wave (mmWave) communication, and the like may be used as the out-of-band communication, but the present disclosure may not be limited thereto. Based on a design of those skilled in the art, Bluetooth communication, RFID communication, near field communication (NFC), infrared short-range wireless communication (IR-DSRC), optical wireless communication (OWC), and the like may be applied.

In addition, the control communication device 211 may exchange information with another urban air mobility via the communication terminal 220.

In addition, the communication terminal (not shown) may be mounted on the supply device 10 as well. In this case, the control communication device 211 may exchange the various control signals and the state information with the supply device 10 via the communication terminal 220.

In addition, the control communication device 211 may exchange the various control signals and the state information with a user device—including, for example, a smartphone, a smart key, and the like—via the communication terminal 220. To this end, the communication terminal 220 may have a Bluetooth communication function for communication with the smart phone and a frequency communication function for communication with the smart key. In this regard, the frequency communication function may include a function of receiving a radio frequency (RF) radio wave of 433.92 MHz frequency from the smart key and a function of transmitting a low frequency (LF) radio wave of 125 kHz frequency to the smart key.

Transmitter state information transmitted from the supply device 10 to the charging device 210 of the urban air mobility 201 may include transmitter identification information, information about maximum transmittable power, information about a supported power category, information about the maximum number of devices that may be charged simultaneously, information about a type of supported charging devices, software version information, firmware version information, communication protocol version information, IP address information, MAC address information, port number information, authentication and security information, and the like.

Receiver state information transmitted from the charging device 210 of the urban air mobility 201 to the supply device 10 may include receiver identification information, information about required power, information about maximum receivable power/voltage/current, information about the battery charged state, information about a battery output voltage, software version information, firmware version information, communication protocol version information, IP address information, MACK address information, port number information, authentication and security information, but the present disclosure may not be limited thereto. In an embodiment, information about the battery charged state and information about the battery output voltage between the urban air mobilities 201 may be exchanged via communication between the communication terminals thereof.

The control communication device 211 may acquire information about the location and capability information of the supply device 10 via the communication terminal 220.

In addition, the control communication device 211 may acquire information about the location and capability information of another nearby urban air mobility 201 via the communication terminal 220.

As an example, the capability information exchanged between the urban air mobilities may include information about whether the corresponding urban air mobility is able to perform the wireless charging and information about whether the wireless charging is available between the urban air mobilities, information about a mounting location of the wireless power transmitting/receiving pad mounted on the corresponding urban air mobility, information about the battery charged state, information about whether the corresponding urban air mobility is on a mission, and the like, but the present disclosure may not be limited thereto.

When the wireless power receiving pad 213 of the charging device 210 is aligned with the wireless power transmitting pad 11 thereof, the control communication device 13 of the supply device 10 may control the power conversion system 12 to convert the power supplied from the power supply network 30 into power required by the urban air mobility 201. Thereafter, the converted power may be transmitted to the wireless power receiving pad 213 of the urban air mobility 201 in an electromagnetic induction manner via the wireless power transmitting pad 11.

When the urban air mobility 201 approaches the supply device 10 to be within a certain distance in association with the sensor 240, the control communication device 211 may perform fine alignment of the transmitting/receiving pad in association with the user device.

Figure 3:
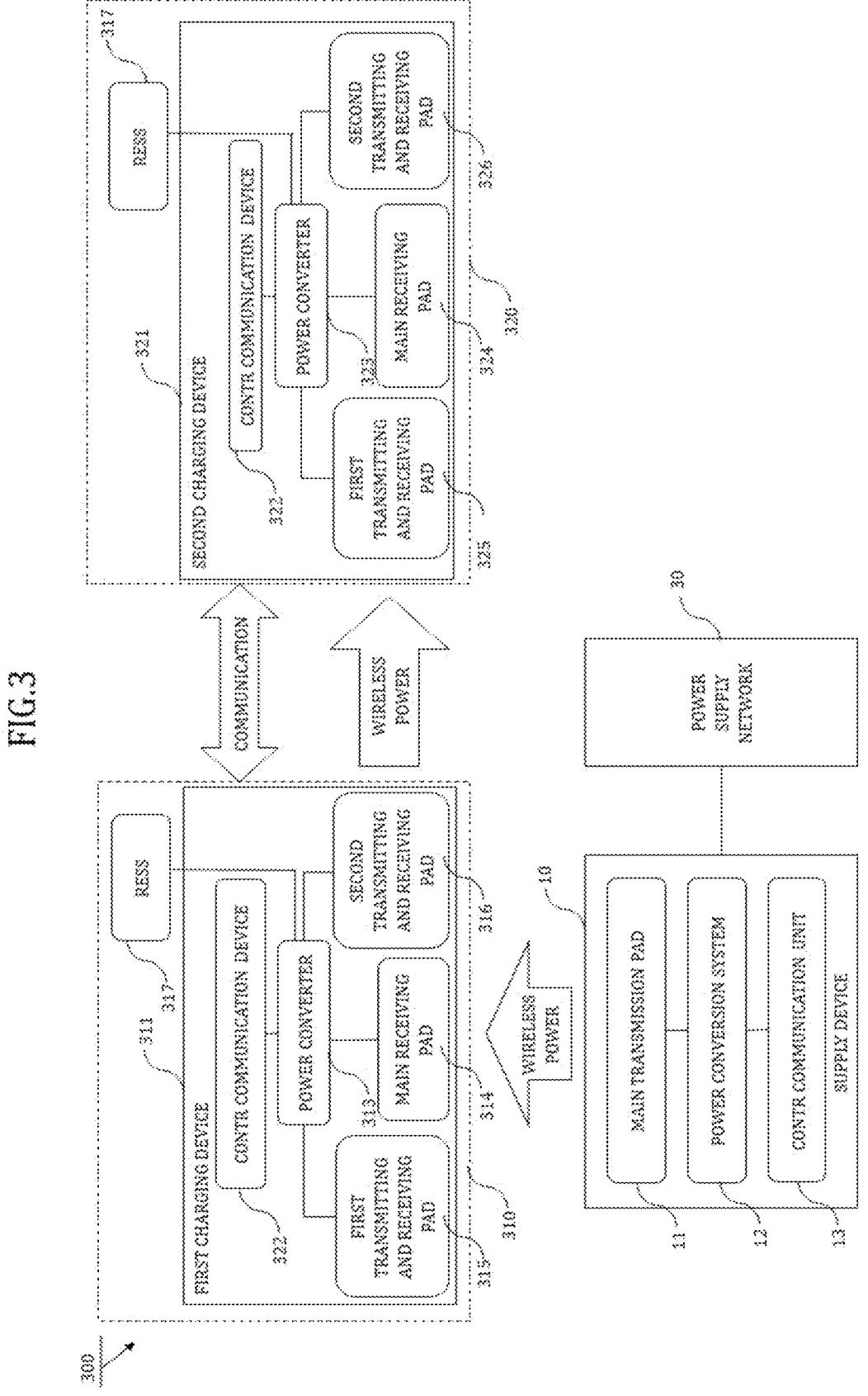
FIG. 3 is a diagram showing configuration of a relay wireless charging chain according to an embodiment.

FIG. 3 is a diagram showing configuration of a relay wireless charging chain according to an embodiment.

A method for configuring a relay wireless charging chain according to the present disclosure may be provided as an alternative to solve a problem of insufficient infrastructure of the supply device for the wireless charging of the urban air mobility.

Referring to FIG. 3, urban air mobilities 310 and 320 may include charging devices 311 and 321 and RESSs 317 and 327, respectively.

The charging devices 311 and 321 may include main receiving pads 314 and 324 for receiving the wireless power from the supply device 10, first to second transmitting and receiving pads 315, 316, 325, and 326 for the wireless power transmission and reception between the urban air mobilities, control communication devices 312 and 322, and power converters 313 and 323 for converting the power in response to control signals of the control communication devices 312 and 322, respectively.

For convenience of description below, a charging device mounted on the first urban air mobility 310 will be referred to as the first charging device 311, and a charging device mounted on the second urban air mobility 320 will be referred to as the second charging device 321.

Referring to FIG. 3, when sensing the main transmitting pad 11 of the supply device 10, the first urban air mobility 310 may align the main transmitting pad 11 and the main receiving pad 314 with each other. When the alignment of the main transmitting/receiving pads is completed, the control communication device 13 of the supply device 10 may determine an amount of power (or an intensity of the transmitted power) via power negotiation with the control communication device 312 of the first urban air mobility 310, and control the power conversion system 12 based on the determined amount of power (or the intensity of the transmitted power) to transmit the wireless power via the main transmitting pad 11.

The power converter 313 of the first charging device 311 may rectify the AC power received via the main receiving pad 314 and convert the AC power into DC power required by the battery to charge the RESS 317.

When the second urban air mobility 320 approaches a rear portion of the first urban air mobility being charged, the second urban air mobility 320 may align the second transmitting/receiving pad 316 of the first urban air mobility 310 with the first transmitting/receiving pad 325 thereof using various sensors mounted therein.

When the transmitting/receiving pads of the first urban air mobility 310 and the second urban air mobility 320 are aligned with each other, the second charging device 321 of the second urban air mobility 320 may receive the wireless power via the power transmission negotiation after communication connection with the first charging device 311 of the first urban air mobility 310.

When succeeding in the power transmission negotiation with the control communication device 322 of the second charging device 312, the control communication device 312 of the first charging device 311 may distribute the power received via the main receiving pad 314 to the RESS 317 and the second transmission/reception pad 316 based on a result of the power transmission negotiation.

The control communication device 312 of the first charging device 311 may distribute the wireless power received from the supply device 10 to the RESS 317 and the second transmission/reception pad 316 based on a battery charged state (or a battery output voltage) corresponding to the RESS 317 thereof, a flight plan/distance of the first urban air mobility 310, and the like.

In one example, the control communication device 312 of the first charging device 311 may block or temporarily stop the relay wireless power supply to the second urban air mobility 320 based on the battery charged state (or the battery output voltage) corresponding to the RESS 317 thereof, the flight plan/distance of the first urban air mobility 310, and the like.

After configuring the wireless power transmission chain with the second urban air mobility 320, the first urban air mobility 310 may provide information about the amount of wireless power provided to the second urban air mobility 320 to the supply device 10 (or a separate billing server). In this regard, the information provided to the supply device 10 may be used for billing for power consumption of the first urban air mobility 310 and the second urban air mobility 320.

FIG. 4 is a diagram for illustrating a method for configuring a wireless charging chain between urban air mobilities during flight according to an embodiment.

Referring to FIG. 4, urban air mobilities 410, 420, and 430 may include charging devices 411, 421, and 431 and RESSs 416, 426, and 436, respectively.

The charging devices 411, 421, and 431 may include transmitting/receiving pads 414/415,424/425, and 434/435 for transmission and reception of the wireless power between the charging devices, control communication devices 412, 422, and 432, and power converters 413, 423, and 433 that convert the AC wireless power received from another charging device into DC power required by a RESS thereof in response to control signals of the control communication devices 412, 422, and 432 to charge the corresponding RESS or convert the power charged in the corresponding RESS into the AC power and transmit the AC power to the corresponding the transmission/reception pad thereof, respectively.

For convenience of description below, a charging device mounted on the first urban air mobility 410 will be referred to as the first charging device 411, a charging device mounted on the second urban air mobility 420 will be referred to as the second charging device 421, and a charging device mounted on the third urban air mobility 430 will be referred to as the second charging device 431.

In order to increase a power transmission/reception efficiency of the wireless charging chain configured between the urban air mobilities, transmission/reception pads of the urban air mobilities should be aligned with each other to be within a certain distance.

As shown in FIG. 4, when it is determined during the flight that flight to a destination is impossible with the current battery charged level, the second urban air mobility 420 may transmit a predetermined rescue request signal to a nearby urban air mobility via an equipped communication terminal (not shown).

The nearby urban air mobility that has received the rescue request signal may determine whether the wireless power supply is available in consideration of a battery charged state thereof and a remaining distance to the destination. The first urban air mobility 410 and the third urban air mobility 430 determined to be capable of supplying the wireless power may fly to a location of the second urban air mobility 420 as shown in a reference numeral 440 and align a transmitting/receiving pad thereof with a transmitting/receiving pad of the second urban air mobility 420 to configure the wireless charging chain between the urban air mobilities.

Thereafter, the second urban air mobility 420 may receive the wireless power from the first urban air mobility 410 and the third urban air mobility 430 to charge a RESS 426 thereof.

Through the embodiment of FIG. 4 described above, the urban air mobility according to the present disclosure may perform the wireless charging in association with the nearby urban air mobility even during the flight. Therefore, there is an advantage in that the wireless power may be quickly and effectively supplied to the corresponding urban air mobility even in a case of flight route deviation and/or remaining battery insufficiency caused by abnormal weather, device failure, flight plan change, and the like.

FIG. 5 is a flowchart for illustrating an in-place alignment method for wireless charging of an urban air mobility according to an embodiment.

The urban air mobility may calculate a distance between the urban air mobility and the supply device based on location information of the supply device and information about a current location thereof. As an example, the location information of the supply device may be GPS-based location information, but this is only one embodiment. The location of the supply device may be obtained using at least one of the ultrasonic sensor, the camera, the LiDAR, and the radar.

The urban air mobility may be controlled such that the distance to the supply device becomes equal to or smaller than a first distance based on the location information of the supply device (S510). As an example, the urban air mobility may calculate a distance to a front lane of the supply device recognized via front camera image analysis. For example, the front lane recognition may be performed when the distance between the supply device and the urban air mobility is equal to or smaller than 3 m.

When the distance between the urban air mobility and the supply device is equal to or smaller than the first distance, the urban air mobility may be horizontally aligned with the supply device based on left/right lane information of the supply device recognized via the front camera image analysis (S520). As an example, the urban air mobility may perform horizontal alignment by identifying an average distance between the left lane and the right lane. That is, the urban air mobility may perform the horizontal alignment to a center between the left and right lanes. For example, the first distance may be set to one value in a range from 1 m to 3 m.

The urban air mobility may recognize a rear lane of the supply device via rear camera image analysis based on the distance between the supply device—that is, the front lane of the supply device—and the urban air mobility becomes equal to or smaller than a second distance (S530). For example, the second distance may be set to one value in a range from 0 cm to 100 cm.

The urban air mobility may longitudinally align the supply device with the urban air mobility based on the recognized rear lane (S540).

The urban air mobility may establish a wireless communication link (or channel) with the supply device after stopping based on completion of the longitudinal alignment (S550). For example, the wireless communication link (or channel) may be established via Wi-Fi communication, Bluetooth communication, NFC communication, RFID communication, and the like, but the present disclosure may not be limited thereto, and may be set established via V2X communication using a commercial mobile communication network or via the inband communication.

The urban air mobility may initiate the wireless charging by performing the power negotiation with the supply device via the established wireless communication link (or channel) (S560).

As an example, information related to the urban air mobility used for the power negotiation may include at least one of information about a type of the urban air mobility, information about a manufacturer/specification and a mounting location of the charging device, information about a version of software/firmware installed in the charging device, information about a supported communication scheme, information about a required power/required amount of power, information about a battery capacity, information about a remaining battery, information about the battery output voltage, information about a minimum required charging efficiency, information about an available charging time (determined based on the flight plan), information about an intensity of maximum receivable power, information about the flight plan, and corridor setting information.

As an example, information related to the supply device used for the power negotiation may include at least one of information about a type of the supply device, information about a manufacturer and a specification of the supply device, information about a version of software/firmware installed in the supply device, information about a supported communication scheme, information about a supported power category, information about a supported urban air mobility type, information about an available amount of power, and information about a chargeable time. In this regard, the power category may be defined based on the intensity of the transmitted power and the wireless charging scheme.

The urban air mobility may measure the wireless charging efficiency based on the transmitted power of the supply device and the received power actually received via the charging device during the wireless charging.

The urban air mobility may determine whether the fine alignment between the wireless power receiving pad (coil) of the urban air mobility and the wireless power transmitting pad (coil) of the supply device is required based on the measured wireless charging efficiency, and perform the fine adjustment based on the determination result (S570). As an example, units of the fine adjustment may be set to front/rear/left/right/top/bottom 1 cm, but this is only one embodiment. The units of the fine adjustment may be set to a value smaller or larger than that based on a design of those skilled in the art.

As an embodiment, the charging device of the urban air mobility may analyze a beam pattern of an electromagnetic wave output from the supply device and determine a fine adjustment direction based on the analyzed beam pattern.

The fine adjustment according to an embodiment may be repeatedly performed until the wireless charging efficiency reaches a reference value. As an example, the wireless charging efficiency reference value may be set to 90%, but this is only one embodiment. The wireless charging efficiency reference value may be set to a value smaller or larger than that based on the design of those skilled in the art or based on requirements of the urban air mobility.

As an example, the fine alignment between the wireless power receiving pad (coil) of the urban air mobility and the wireless power transmitting pad (coil) of the supply device may be performed by adjusting a vertical separated distance between the wireless power receiving pad (coil) and/or the wireless power transmitting pad—that is, a z-axis location (coordinate)—, but this is only one embodiment. Another embodiment may be made by adjusting a three-dimensional separated distance between the wireless power receiving pad (coil) and/or the wireless power transmitting pad—that is, x/y/z-axis locations (coordinates).

To this end, the supply device and/or the charging device of the urban air mobility according to an embodiment may further include a driving device including a driving motor and a driving shaft capable of controlling vertical and/or horizontal locations of the wireless power transmitting pad and/or the wireless power receiving pad.

In one example, the fine alignment according to another embodiment may be made by a driver directly moving the urban air mobility based on guide information provided via an user interface screen of the urban air mobility, but this is only one embodiment. The fine alignment according to another embodiment may be made by remotely controlling the urban air mobility with the smart key based on the guide information provided via the screen on the user device—for example, the smartphone—in association with the urban air mobility.

In an embodiment, the camera mounted on the urban air mobility may be a surround view monitor (SVM) camera.

An image filmed by the SVM camera may be input to a deep learning-based semantic segmentation network mounted on the urban air mobility, and the deep learning-based semantic segmentation network may output a lane classification image related to lanes arranged around the supply device via learning. For example, the classified lanes may include the front lane, the left lane, the right lane, and the rear lane.

FIG. 6 is a flowchart for illustrating an in-place alignment method for wireless charging of an urban air mobility according to another embodiment.

Referring to FIG. 6, the urban air mobility may be controlled such that the distance to the supply device becomes equal to or smaller than the first distance based on the location information of the supply device (S610).

The urban air mobility may be paired with the user device and the smart key after stopping based on the distance to the supply device becoming equal to or smaller than the first distance (S620).

The urban air mobility may perform primary alignment of the wireless power transmitting/receiving pads by moving the urban air mobility to the supply device in response to a control signal received from the paired smart key (S630).

As an example, the urban air mobility may determine that the primary alignment is completed based on the supply device recognizing the charging device mounted on the urban air mobility.

As another example, when sensing, by the charging device, a predetermined wireless power signal—for example, an analog ping signal, a digital ping signal, a short beacon signal, a long beacon signal, and the like—transmitted by the supply device, the urban air mobility may determine that the primary alignment is completed.

As another example, the urban air mobility may identify the location of the wireless power transmitting pad of the supply device by analyzing the image filmed by the camera, and determine that the primary alignment is completed based on the identified location of the wireless power transmitting pad matching the location of the wireless power receiving pad disposed in the charging device.

The urban air mobility may stop after completing the primary alignment, establish the wireless communication link with the supply device, and then initiate low-power charging (S640). In this regard, the low-power charging may mean that the supply device transmits the wireless power with power equal to or less than the power required to charge the battery of the urban air mobility. For example, during the low-power charging, the supply device may supply only power necessary for the operation of the charging device.

The urban air mobility may perform the wireless charging efficiency calculation and the beam pattern analysis based on the wireless power received from the supply device (S650).

The urban air mobility may transmit information about the calculated wireless charging efficiency and the analyzed beam pattern to the paired user device (S660). In this regard, the urban air mobility and the user device may exchange the information with each other via the V2X communication, but this is only one embodiment. In another embodiment, the information may be exchanged via the Bluetooth communication, the Wi-Fi communication, and the like.

The urban air mobility may perform secondary alignment for the wireless power transmitting/receiving pads based on the control signal received from the paired smart key (S670). As an example, the user may determine a moving direction of the urban air mobility based on the information about the wireless charging efficiency and the beam pattern analysis displayed on the user device, and control the secondary alignment for the wireless power transmitting/receiving pads by selecting a travel control button of the smart key based on the determined moving direction.

The urban air mobility may compare the wireless charging efficiency calculated based on the secondary alignment with the predetermined reference value (S680).

When the wireless charging efficiency exceeds the predetermined reference value as a result of comparison, the urban air mobility may determine that the secondary alignment has been successfully completed and initiate high-power charging (S690). In this regard, during the high-power charging, the urban air mobility may receive power enough to charge the battery.

When the wireless charging efficiency is equal to or lower than a predetermined reference value as a result of the comparison in operation 680, the urban air mobility may re-perform the secondary alignment process by entering operation 650 described above.

FIG. 7 is a flowchart for illustrating an in-place alignment method for wireless charging of an urban air mobility according to another embodiment.

Referring to FIG. 7, the urban air mobility may measure the location of the urban air mobility based on a global navigation satellite system (GNSS) signal received via the equipped GPS receiver (S710). For example, the urban air mobility may acquire location information with higher precision of a cm level by correcting the location information of information received from a separate fixed reference station in addition to the GPS receiver using a differential global positioning system (DGPS) or a real time kinematic (RTK) technology that fuses with the GPS reception information. In addition, the urban air mobility may acquire the location information with the higher precision by mitigating errors occurred in a differential global positioning system (DGPS) or a real time kinematic (RTK) technology in a manner of software way or by fusion of sensing information of an inertial navigation sensor such as an odometer, an accelerometer, and a gyroscope. As another example, the urban air mobility may improve positioning accuracy by correcting the GNSS reception information in a map matching scheme of mapping a road and a landmark detected with the camera image and the LiDAR sensor to locations on a map using a precise electronic map such as a local dynamic map (LDM) that provides dynamic map information.

The urban air mobility may acquire the location information of the supply device via the wireless communication with the supply device (S720). In this regard, the location information of the supply device may be location information corresponding to the wireless power transmitting pad equipped in the supply device, and may be pre-measured with high precision and maintained in the internal memory of the supply device.

The urban air mobility may autonomously drive based on the measured location information thereof and the location information of the supply device to move to the supply device and then stop (S730).

The urban air mobility may perform the primary alignment of the wireless power transmitting/receiving pads after stopping (S740).

As an example, the urban air mobility may determine that the primary alignment is completed based on the supply device recognizing the charging device mounted on the urban air mobility.

As another example, when the predetermined wireless power signal—for example, the analog ping signal, the digital ping signal, the short beacon signal, the long beacon signal, and the like—transmitted by the supply device is sensed by the charging device, the urban air mobility may determine that the primary alignment is completed.

As another example, the urban air mobility may identify the location of the wireless power transmitting pad of the supply device by analyzing the image filmed by the camera, and determine that the primary alignment is completed based on the identified location of the wireless power transmitting pad matching the location of the wireless power receiving pad equipped in the charging device.

The urban air mobility may initiate the low-power charging after establishing the wireless communication link with the supply device after completing the primary alignment (S750). In this regard, the low-power charging may mean that the supply device transmits the wireless power with the power equal to or less than the power required to charge the battery of the urban air mobility. For example, during the low-power charging, the supply device may supply only the power necessary for the operation of the charging device.

The urban air mobility may perform the wireless charging efficiency calculation and the beam pattern analysis based on the wireless power received from the supply device (S760).

The urban air mobility may perform the secondary alignment of the wireless power transmitting/receiving pads based on the calculated wireless charging efficiency and the analyzed beam pattern (S770).

The urban air mobility may compare the wireless charging efficiency calculated based on the secondary alignment with the predetermined reference value (S780).

When the wireless charging efficiency exceeds the predetermined reference value as the result of the comparison, the urban air mobility may determine that the secondary alignment has been successfully completed and initiate the high-power charging (S790). In this regard, during the high-power charging, the urban air mobility may receive the power enough to charge the battery.

When the wireless charging efficiency is equal to or lower than the predetermined reference value as the result of the comparison in operation 780, the urban air mobility may re-perform the secondary alignment process by entering operation 760 described above.

FIG. 8 is a flowchart for illustrating an in-place alignment method for wireless charging of an urban air mobility according to another embodiment.

Referring to FIG. 8, the urban air mobility may measure the location of the urban air mobility based on the global navigation satellite system (GNSS) signal received via the equipped GPS receiver (S810). For example, the urban air mobility may acquire the location information with the higher precision of the cm level by correcting the location information—that is, GSP (X,Y) coordinate information—of information received from the separate fixed reference station in addition to the GPS receiver using the differential global positioning system (DGPS) or the real time kinematic (RTK) technology that fuses with the GPS reception information. In addition, the urban air mobility may acquire the location information with the higher precision by mitigating the errors occurred in the differential global positioning system (DGPS) or the real time kinematic (RTK) technology in the manner of software way or by fusion of the sensing information of the inertial navigation sensor such as the odometer, the accelerometer, and the gyroscope. As another example, the urban air mobility may improve the positioning accuracy by correcting the GNSS reception information in the map matching scheme of mapping the road and the landmark detected with the camera image and the LiDAR sensor to the locations on the map using the precise electronic map such as the local dynamic map (LDM) that provides the dynamic map information.

The urban air mobility may acquire the location information of the supply device via the wireless communication with the supply device (S820). In this regard, the location information of the supply device may be the location information corresponding to the wireless power transmitting pad equipped in the supply device, and may be pre-measured with the high precision and maintained in the internal memory of the supply device.

The urban air mobility may be paired with the user device and the smart key by autonomously driving based on the measured location information thereof and the location information of the supply device to move to the supply device and then stopping (S830).

The urban air mobility may perform the primary alignment of the wireless power transmitting/receiving pads after stopping (S840).

As an example, the urban air mobility may determine that the primary alignment is completed based on the supply device recognizing the charging device mounted on the urban air mobility.

As another example, when the predetermined wireless power signal—for example, the analog ping signal, the digital ping signal, the short beacon signal, the long beacon signal, and the like—transmitted by the supply device is sensed by the charging device, the urban air mobility may determine that the primary alignment is completed.

As another example, the urban air mobility may identify the location of the wireless power transmitting pad of the supply device by analyzing the image filmed by the camera, and determine that the primary alignment is completed based on the identified location of the wireless power transmitting pad matching the location of the wireless power receiving pad equipped in the charging device.

The urban air mobility may initiate the low-power charging after establishing the wireless communication link with the supply device after completing the primary alignment (S850). In this regard, the low-power charging may mean that the supply device transmits the wireless power with the power equal to or less than the power required to charge the battery of the urban air mobility. For example, during the low-power charging, the supply device may supply only the power necessary for the operation of the charging device.

The urban air mobility may perform the wireless charging efficiency calculation and the beam pattern analysis based on the wireless power received from the supply device (S860).

The urban air mobility may transmit the information about the calculated wireless charging efficiency and the analyzed beam pattern to the paired user device (S870). In this regard, the urban air mobility and the user device may exchange the information with each other via the V2X communication, but this is only one embodiment. In another embodiment, the information may be exchanged via the Bluetooth communication, the Wi-Fi communication, and the like.

The urban air mobility may perform the secondary alignment for the wireless power transmitting/receiving pads based on the control signal received from the paired smart key (S880). As an example, the user may determine an optimal moving direction of the urban air mobility based on the information about the wireless charging efficiency and the beam pattern analysis displayed on the user device, and control the secondary alignment for the wireless power transmitting/receiving pads by selecting the travel control button of the smart key based on the determined optimal moving direction. In this regard, a unit of the movement in the secondary alignment may be set to 1 cm, but this is only one embodiment. The unit of the movement may be adaptively set based on a design of those skilled in the art and a required wireless charging efficiency.

The urban air mobility may compare the wireless charging efficiency calculated based on the secondary alignment with the predetermined reference value (S890).

When the wireless charging efficiency exceeds the predetermined reference value as the result of comparison, the urban air mobility may determine that the secondary alignment has been successfully completed and initiate the high-power charging (S8950). In this regard, during the high-power charging, the urban air mobility may receive the power enough to charge the battery.

When the wireless charging efficiency is equal to or lower than the predetermined reference value as the result of the comparison in operation 890, the urban air mobility may re-perform the secondary alignment process by entering operation 860 described above.

Figure 9B:
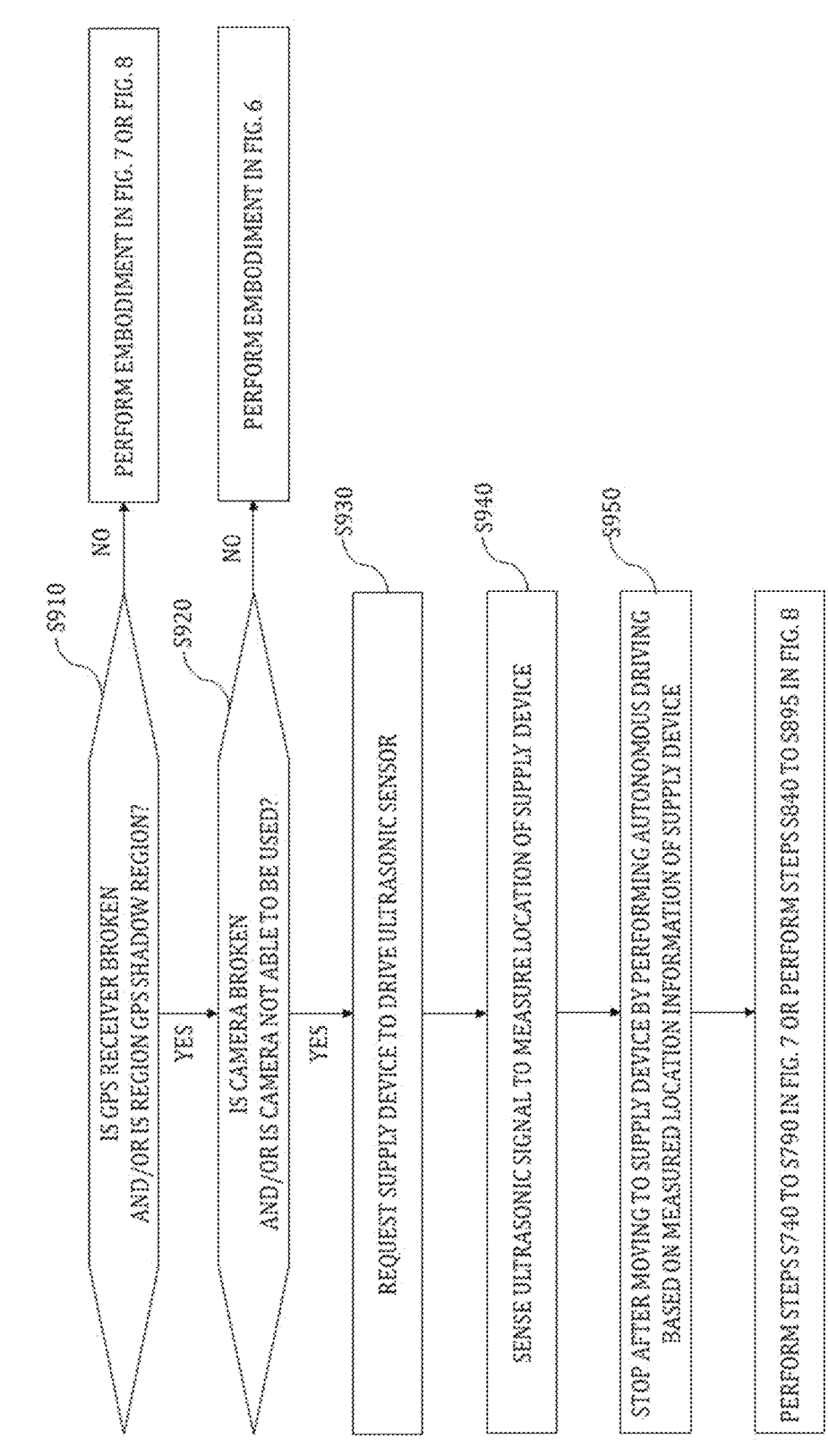

(a) in FIG. 9 is a flowchart for illustrating an in-place alignment method for wireless charging of an urban air mobility according to another embodiment.

Referring to (a) in FIG. 9, the urban air mobility may acquire the location information of the supply device (S911). In this regard, the location information of the supply device may be received from the supply device or an urban air mobility control center that manages the supply device via the wireless communication in response to the charging request of the urban air mobility. As an example, the location information may be the GPS coordinate information.

The urban air mobility may move to the supply device based on the acquired location information (S921). As an example, the urban air mobility may move to the supply device via the autonomous driving, but this is only one embodiment. The urban air mobility may move to the supply device via driver control or in association with the external user device.

The urban air mobility may sense the sensor signal of the supply device based on the distance to the supply device becoming equal to or smaller than the first distance (S931). In this regard, the sensor signal may be the signal output from the ultrasonic sensor equipped in the supply device, and the urban air mobility may sense the ultrasonic signal of the supply device using the equipped ultrasonic sensor. As an example, the first distance may be determined based on precision of the GPS coordinates.

The urban air mobility may perform the wireless charging with first power after moving to the supply device based on the sensed sensor signal and then stopping (a first charging operation) (S941). In this regard, in the first charging operation, the actual battery charging may not be performed. As an example, the first power may be set to the power required for the operation of the charging device equipped in the urban air mobility.

The urban air mobility may calculate and/or analyze the wireless charging efficiency and/or the beam pattern during the first charging (S951).

The urban air mobility may perform the fine alignment based on the calculated wireless charging efficiency and/or beam pattern (S961). In this regard, the fine alignment may mean the operation of adjusting the distance between the wireless power transmitting pad mounted on the supply device and the wireless power receiving pad mounted on the urban air mobility in the predetermined units of cm. The fine alignment according to an embodiment may be performed via the autonomous driving of the urban air mobility, but this is only one embodiment. As in the above-described embodiments, the fine alignment may be performed in association with the external user device—for example, the user device (the smartphone) and the smart key—.

The urban air mobility may compare the wireless charging efficiency with the predetermined reference value (S971).

The urban air mobility may perform the wireless charging with second power based on the wireless charging efficiency exceeding the predetermined reference value (a second charging operation) (S981). In the second charging operation, the urban air mobility may charge the equipped battery using the second power received from the supply device.

When the wireless charging efficiency is equal to or lower than the predetermined reference value as a result of the comparison in operation 971, the urban air mobility may re-perform the fine alignment by entering operation 951 described above.

The first to second powers are the wireless AC power transmitted by the supply device in the electromagnetic induction scheme or the electromagnetic resonance scheme, and the second power may be set to be greater than the first power.

The present disclosure has an advantage of effectively blocking unnecessary power waste by performing the low-power charging until the micro-alignment is completed.

In the embodiment of (a) in FIG. 9 described above, the urban air mobility may sense the left/right lanes of the supply device by analyzing the image of the equipped front camera while moving to the supply device based on the sensed sensor signal, and further perform the horizontal alignment based on the sensed distances to the left/right lanes. In addition, the urban air mobility may sense the rear lane of the supply device by analyzing the image of the equipped rear camera after stopping, and further perform the longitudinal alignment based on the sensed rear lane.

(b) in FIG. 9 is a flowchart for illustrating an in-place alignment method for wireless charging of an urban air mobility according to another embodiment.

Referring to (b) in FIG. 9, the urban air mobility may determine whether the GPS receiver is broken and/or whether a region is a GPS shadow region (S910). In this regard, the GPS shadow region may include a region where a GPS signal reception level is equal to or lower than a reference value, the location measurement is not possible, or positioning accuracy is equal to or lower than a reference value.

When the GPS receiver is broken and/or the region is the GPS shadow region as a result of the determination, the urban air mobility may determine whether the camera is broken and/or the camera is not able to be used (S920). In this regard, the condition in which the camera cannot be is not able to be used may include a condition in which specific objects such as an obstacle, a landmark, and a lane are not able to be classified via the camera image analysis due to a bad weather condition or a night condition.

When the camera is broken and/or the camera is not able to be used as a result of the determination, the urban air mobility may request the supply device to drive the ultrasonic sensor (S930). In this regard, the supply device may transmit the ultrasonic signal by driving the ultrasonic sensor in response to the ultrasonic sensor driving request.

The urban air mobility may measure the location of the supply device based on the sensed ultrasonic signal (S940).

The urban air mobility may be stopped after moving to the supply device by performing the autonomous driving based on the measured location information of the supply device (S950).

Thereafter, the urban air mobility may perform operations 740 to 790 in FIG. 7 described above, or perform operations 840 to 895 in FIG. 8 after pairing with the user device and the smart key.

When the GPS receiver is not broken and/or the region is not the GPS shadow region as the result of the determination in operation 910, the urban air mobility may perform the embodiment in FIG. 7 or FIG. 8 described above.

When the camera is not broken and/or the camera is able to be used as a result of the determination in operation 920, the urban air mobility may perform the embodiment in FIG. 6 described above.

FIG. 10 is a block diagram for illustrating a configuration of an urban air mobility according to an embodiment.

Referring to FIG. 10, an urban air mobility 1000 may include at least one of a vehicle control unit (VCU) 1010, a sensor 1020, a GPS receiver 1030, a battery 920, a communication terminal 1040, an output device 1050, an electric control unit (ECU) 1060, a memory 1070, a charging device 1080, and a battery 1090.

The VCU 1010 may control overall operations and input/output of the urban air mobility 1000. The VCU 1010 may monitor a real-time operating state of the urban air mobility 1000, and exchange state information with an external UAM control center, a vertiport, and the like.

The sensor 1020 may include a camera 1021, an ultrasonic sensor 1022, and the like, but the present disclosure may not be limited thereto. The sensor 1020 may further include at least one of a smart parking assistance system (SPAS) sensor, a LiDAR, a radar, and an inertial measurement sensor. The camera 1021 according to an embodiment may include an SVM camera. In this regard, the SVM camera may include at least one of a front camera, a left/right camera, a rear camera, and a lower camera.

The VCU 1010 may collect various sensing information and the state information from a sub-module via the UAM internal communication network. When specific control is required based on the sensing information and the state information, a control command may be transmitted to the corresponding sub-module. In this regard, the sub-module may include the sensor 1020, the communication terminal

1040, the output device 1050, the ECU 1060, the charging device 1080, and the like, but the present disclosure may not be limited thereto.

In this regard, the UAM internal communication network may include a controller area network (CAN), a local interconnect network (LIN), a FlexRay, and a media oriented systems transport (MOST) communication network, but the present disclosure may not be limited thereto.

The VCU 1010 may communicate with the external device—for example, at least one of a user device 1091, a smart key 1092, a UAM control center 1093, and a supply device 10 via the communication terminal 1040.

The communication terminal 1040 may have a first communication module for connection to a 4G/5G commercial mobile communication network, a second communication module for short-range wireless communication, a third communication module for connection to an aviation voice communication network, a fourth communication module for RF communication, and the like. For example, the communication terminal 1040 may communicate with the user device 1091, the UAM control center 1093, the communication terminal of another urban air mobility, the supply device 10, and the like using at least one of the first to third communication modules. The communication terminal 1040 may receive a RF control signal received from the smart key 1092 for the fine alignment via the fourth communication module, and the received RF control signal may be transmitted to the VCU 1010.

The output device 1050 may include a display, a speaker, a vibration module, and the like.

The ECU 1060 may include a steering system, a driving system, a braking system, a vertical taking-off and landing system, a navigation control system, a battery management system, and the like, but the present disclosure may not be limited thereto. In this regard, the driving system may be composed of a travel driving system that drives a motor for land travel and a flight driving system that drives a motor for aerial flight.

The charging device 1080 may receive the wireless power from the supply device 1400 to charge the battery 1090. In addition, the charging device 1080 may receive or transmit the wireless power in association with the charging device mounted on another urban air mobility. Detailed configurations and operations of the charging device 1080 and the supply device 10 will be replaced with the above description.

The memory 1070 may maintain various software/firmware and various parameter setting information necessary for the operation of the urban air mobility 1000. In particular, various software engines for machine learning may be loaded in the memory 1070.

In addition, operations performed in the urban air mobility in the above-described embodiments may be performed under control of the VCU 1010, and the detailed operation of the VCU 1010 will be replaced with the description of FIGS. 5 to 9 described above.

Figure 11:
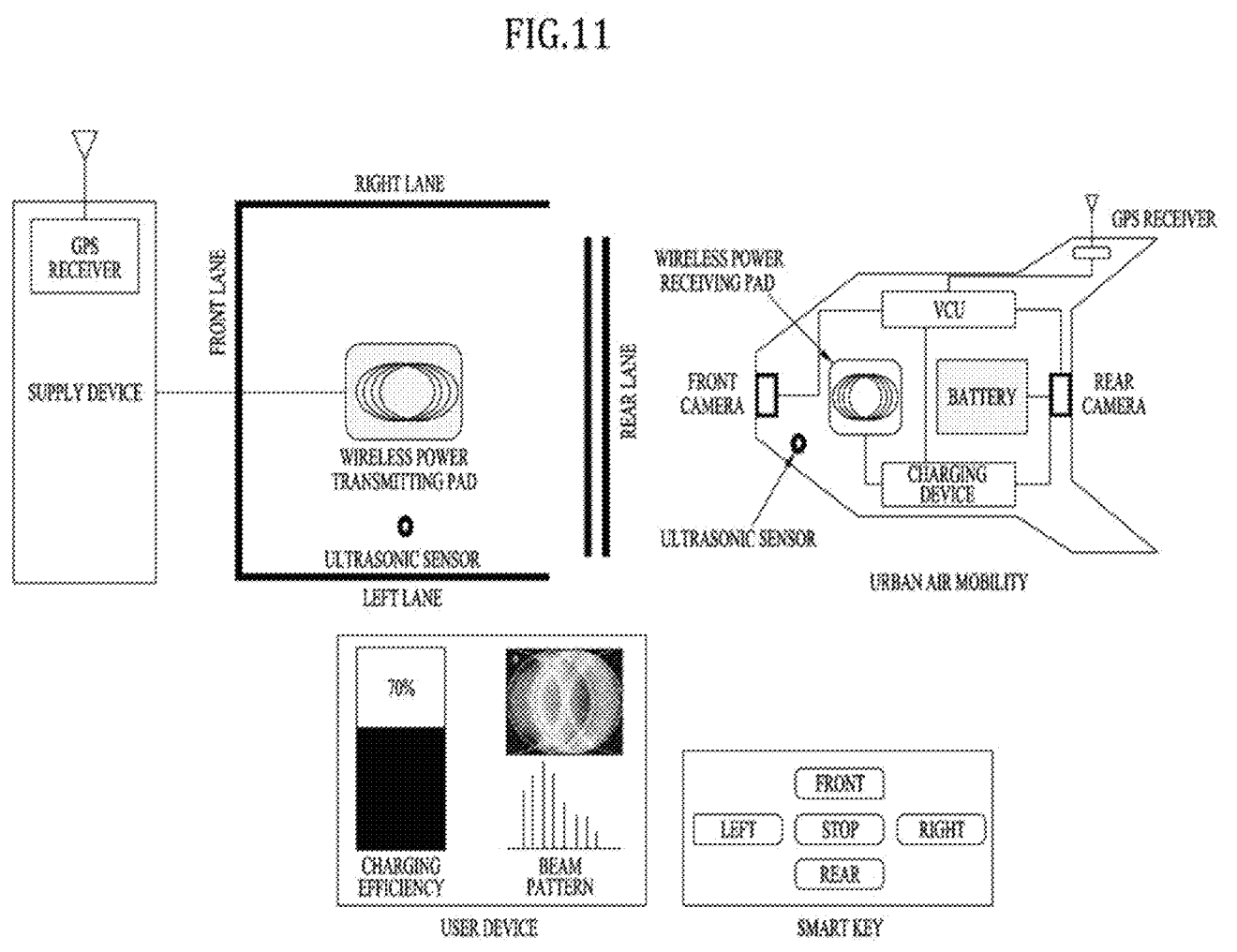

FIG. 11 is a diagram for illustrating an in-place alignment method for wireless charging of an urban air mobility according to an embodiment.

Referring to FIG. 11, the urban air mobility may acquire lane information of a charging station by analyzing the front camera image. In this regard, the lane information may include front lane information, right lane information, and left lane information.

The urban air mobility may calculate the distance to the supply device based on the acquired lane information.

The urban air mobility may move to the supply device based on the calculated distance to the supply device after performing the horizontal alignment control based on the left/right lane information.

When the movement to the supply device is completed, the urban air mobility may analyze the wireless front and rear camera images after stopping to sense the location of the rear lane, and perform the longitudinal alignment control based on the sensed location of the rear lane.

The urban air mobility may initiate the charging by receiving the wireless power from the supply device after being in communication connection with the supply device based on the completion of the longitudinal alignment control. In this regard, the urban air mobility may receive information about an intensity of initially transmitted power from the supply device via the inband or out-of-band communication.

The charging device of the urban air mobility according to an embodiment may calculate the wireless charging efficiency based on the intensity of the received power and the intensity of the initially transmitted power acquired from the supply device. In addition, the urban air mobility may analyze the beam pattern for the wireless power received via the wireless power receiving pad.

The urban air mobility according to an embodiment may transmit the information about the calculated charging efficiency and the information about the analyzed beam pattern to the pre-paired user device.

The user may determine a fine alignment direction of the urban air mobility based on the charging efficiency and the beam pattern displayed on the user device, and may finely adjust the location of the urban air mobility using a direction control button—for example, a front/rear/left/right button—equipped on the smart key. The fine alignment using the smart key may be repeatedly performed until the wireless charging efficiency reaches the preset reference value.

The urban air mobility according to an embodiment may acquire the current location information—that is, the GPS coordinate information—thereof based on the signal received via the equipped GPS receiver, and may receive the location information of the supply device—for example, the GPS coordinate information of the supply device—via the wireless communication. In this case, the urban air mobility may move to the supply device by performing the autonomous driving based on the current location information thereof and the location information of the supply device. The urban air mobility may move to the supply device, and when the primary alignment between the wireless power transmitting/receiving pads is completed, calculate the wireless charging efficiency and analyze the beam pattern as described above. The urban air mobility may autonomously drive until the calculated wireless charging efficiency reaches the predetermined reference value to perform the secondary alignment between the wireless power transmitting/receiving pads. The urban air mobility may initiate the charging of the equipped battery using the received wireless power when the secondary alignment is completed.

The urban air mobility according to an embodiment may determine the type of sensor for the in-place alignment of the wireless power transmitting/receiving pads adaptively based on the driven states of the equipped sensors. For example, when a driven state of the camera is not normal, the urban air mobility may use the GPS receiver. As another example, when a driven state of the GPS receiver is not normal, the urban air mobility may use the camera. As another example, when both the driven states of the GPS receiver and the camera are not normal, the urban air mobility may use the ultrasonic sensor. In one example, the urban air mobility may perform the in-place alignment of the wireless power transmitting/receiving pads by fusing the plurality of sensors with each other based on the driven states of the sensors. For example, as the more precise location information is acquired by fusing at least two of the camera, the GPS receiver, and the ultrasonic sensor with each other, the in-place alignment of the wireless power transmitting/receiving pads may be performed.

In the above embodiment, the description was made with the example in which the types of sensors and receiver mounted on the urban air mobility are the camera, the GPS receiver, and the ultrasonic sensor, but this is only one embodiment. Another embodiment may further include at least one of the LiDAR, the radar, and the inertial measurement sensor.

FIG. 12 is a diagram for illustrating an in-place alignment method for wireless charging of an urban air mobility capable of vertical take-off and landing according to an embodiment of the present disclosure.

Referring to FIG. 12, the urban air mobility 1000 capable of the vertical take-off and the landing may make a request for a charging request signal containing the location information thereof during the flight to the UAM control center 1093, and acquire location information of an available vertiport 1110 from the UAM control center 1093. The UAM control center 1093 may identify the available optimal supply device 10 corresponding to the current location of the urban air mobility 1000, and provide the vertiport location information corresponding to the identified supply device 10 to the urban air mobility 1000.

The urban air mobility 1000 may move to the vertiport 1110 by performing autonomous flight based on the location information of the vertiport 1110.

The urban air mobility 1000 may identify a location of a wireless power transmitting pad 1112 disposed at one side of the vertiport 1110 by analyzing the equipped lower camera image when the movement to the vertiport 1110 is completed.

The urban air mobility 1000 may control an equipped wireless power receiving pad 1130 and the wireless power transmitting pad 1112 to be aligned with each other in the horizontal direction based on the identified location of the wireless power transmitting pad 1112. In this regard, the horizontal alignment may be performed in the flight state.

The urban air mobility 1000 may maintain a distance between the wireless power receiving pad 1130 and the wireless power transmitting pad 1112 to be equal to or smaller than the first distance by performing the primary vertical alignment when the horizontal alignment is completed.

The urban air mobility 1000 may terminate the flight based on the distance between the wireless power receiving pad 1130 and the wireless power transmitting pad 1112 becoming equal to or smaller than the first distance, and may be in communication connection with the supply device 10 to initiate the low-power charging.

The urban air mobility 1000 may calculate the wireless charging efficiency during the low-power charging. The urban air mobility 1000 may perform the secondary vertical alignment within a preset limit distance until the calculated wireless charging efficiency reaches the predetermined reference value.

When the secondary vertical alignment is completed, the urban air mobility 1000 may initiate the high-power charging to charge the battery.

The secondary vertical alignment according to an embodiment may control the wireless power receiving pad 1130 and/or the wireless power transmitting pad 1112 to move in the vertical direction via a driving motor thereof.

Steps in a method or algorithm described in relation to the embodiments disclosed herein may be directly implemented in hardware, a software module, or a combination of the two, executed by a processor. The software module may reside in a storage medium (i.e., a memory and/or storage) such as a RAM, a flash memory, a ROM, an EPROM, an EEPROM, a registers, a hard disk, a removable disk, or a CD-ROM.

An exemplary storage medium may be coupled to the processor, the processor may read information from, and write information to, the storage medium. Alternatively, the storage medium may be integrated with the processor. The processor and storage medium may reside within an application specific integrated circuit (ASIC). The ASIC may reside within the user terminal. Alternatively, the processor and storage medium may reside as separate components within the user terminal.

The above description is merely illustrative of the technical spirit of the present disclosure. It will be apparent to those skilled in the art that various modifications and variations can be made in the present disclosure without departing from the spirit and scope of the disclosure.

Therefore, the embodiments disclosed in the present disclosure are merely illustrative of the technical spirit of the present disclosure. The scope of the technical spirit of the present disclosure is not limited by these embodiments. The scope of the present disclosure should be construed by the appended claims, and all technical ideas within the scope equivalent thereto should be construed as being within the scope of the present disclosure.

What is claimed is:

1. A wireless charging method in an urban air mobility, the method comprising:

acquiring location information of a supply device for supplying wireless power;

moving the urban air mobility to the supply device based on the location information;

performing pairing with a user equipment (UE) based on a distance from the urban air mobility to the supply device;

identifying a location of a wireless power transmitting pad of the supply device by analyzing an image filmed by a camera of the urban air mobility;

aligning a wireless power receiving pad of the urban air mobility and the wireless power transmitting pad of the supply device based on a control signal of the paired UE;

determining that an alignment is completed based on the identified location of the wireless power transmitting pad of the supply device matching a location of the wireless power receiving pad of the urban air mobility; and charging a battery of the urban air mobility by receiving wireless power from the supply device based on completion of the alignment, wherein the aligning includes a primary alignment performing an alignment between the wireless power receiving pad and the wireless power transmitting pad based on the control signal received from a smart key of the paired UE without transmitting information to the paired UE for the alignment, the method further comprises:

stopping the urban air mobility after completing the primary alignment, establishing a wireless communication link between the urban air mobility and the supply device, and initiating low-power charging,
calculating wireless charging efficiency during the low-power charging;
after performing the low-power charging, performing a fine alignment between the wireless power receiving pad and the wireless power transmitting pad;
performing the fine alignment until the wireless charging efficiency exceeds a predetermined value; and
performing high-power charging after the fine alignment being completed.

2. The method of claim 1, wherein:
the smart key transmits the control signal through radio frequency (RF) communication, and
wherein the smart key includes at least one of a forward movement button, a backward movement button, a left movement button, a right movement button, and a stop button of the urban air mobility.

3. The method of claim 1, wherein:
the UE further includes a user device; and
wherein the method further comprises:
transmitting information related to the calculated wireless charging efficiency to the user device; and
performing the fine alignment between the wireless power receiving pad and the wireless power transmitting pad based on the control signal received from the smart key in response to the transmitted information.

4. The method of claim 1, wherein:
first power required for driving a charging device equipped in the urban air mobility is received from the supply device during the low-power charging; and
second power required for charging the battery of the urban air mobility is received from the supply device during the high-power charging,
wherein the second power is greater than the first power.

5. The method of claim 1, wherein:
the UE further includes a user device; and
the method further comprises:
analyzing a beam pattern based on the wireless power received from the supply device during the low-power charging;
transmitting information related to the analyzed beam pattern to the user device; and
performing the fine alignment between the wireless power receiving pad and the wireless power transmitting pad based on the control signal received from the smart key in response to the transmitted information.

6. The method of claim 1, wherein:
the location information of the supply device is received from the supply device or an urban air mobility control center for managing the supply device via wireless communication in response to a charging request of the urban air mobility, wherein the location information includes GPS coordinate information of the supply device.

7. The method of claim 1, further comprising:
aligning a transmitting/receiving pad of the urban air mobility and a transmitting/receiving pad of another urban air mobility; and
distributing power from the urban air mobility to the another urban air mobility via the transmitting/receiving pad of the urban air mobility and the transmitting/receiving pad of the another urban air mobility.

8. A non-transitory computer readable storage medium for storing at least one computer program including an instruction that, when executed by at least one processor, causes the at least one processor to perform wireless charging operations in an urban air mobility in association with a supply device via wireless communication, wherein the operations comprising:
acquiring location information of the supply device for supplying wireless power;
moving the urban air mobility to the supply device based on the location information;
performing pairing with a user equipment (UE) based on a distance from the urban air mobility to the supply device;
identifying a location of a wireless power transmitting pad of the supply device by analyzing an image filmed by a camera of the urban air mobility;
aligning a wireless power receiving pad of the urban air mobility and the wireless power transmitting pad of the supply device based on a control signal of the paired UE;
determining that an alignment is completed based on the identified location of the wireless power transmitting pad of the supply device matching a location of the wireless power receiving pad of the urban air mobility; and
charging a battery of the urban air mobility by receiving wireless power from the supply device based on completion of the alignment,
wherein the aligning includes a primary alignment performing an alignment between the wireless power receiving pad of the urban air mobility and the wireless power transmitting pad of the supply device based on the control signal received from a smart key of the paired UE without transmitting information to the paired UE for the alignment,
the method further comprises:
stopping the urban air mobility after completing the primary alignment, establishing a wireless communication link between the urban air mobility and the supply device, and initiating low-power charging,
calculating wireless charging efficiency during the low-power charging;
after performing the low-power charging, performing a fine alignment between the wireless power receiving pad and the wireless power transmitting pad;
performing the fine alignment until the wireless charging efficiency exceeds a predetermined value; and
performing high-power charging after the fine alignment being completed.

9. An urban air mobility equipped with a wireless charging function, the urban air mobility comprising:
a communication terminal for performing communication with an external device;
an electronic controller for controlling operation and movement of the urban air mobility;
a rechargeable battery;
a charging device for converting power received via a wireless power receiving pad to charge the battery; and
a vehicle controller for controlling the communication terminal and the charging device,
wherein the vehicle controller is configured to:
acquire location information of a supply device for supplying wireless power via the communication terminal;
control the electronic controller based on the location information to move the urban air mobility to the supply device;

perform pairing with a user equipment (UE) based on a distance from the urban air mobility to the supply device;

identify a location of a wireless power transmitting pad of the supply device by analyzing an image filmed by a camera of the urban air mobility;

perform an alignment of a wireless power receiving pad of the urban air mobility and a wireless power transmitting pad of the supply device based on a control signal of the paired UE;

determine that an alignment is completed based on the identified location of the wireless power transmitting pad of the supply device matching a location of the wireless power receiving pad of the urban air mobility; and control the charging device to perform wireless charging, after completion of the alignment, wherein the aligning includes a primary alignment performing an alignment between the wireless power receiving pad of the urban air mobility and the wireless power transmitting pad of the supply device based on the control signal received from a smart key of the paired UE without transmitting information to the paired UE for the alignment, the vehicle controller is further configured to:

stop the urban air mobility after completing the primary alignment, establishing a wireless communication link between the urban air mobility and the supply device, and initiating low-power charging, calculate wireless charging efficiency during the low-power charging;

after performing the low-power charging, perform a fine alignment between the wireless power receiving pad and the wireless power transmitting pad;

perform the fine alignment until the wireless charging efficiency exceeds a predetermined value; and perform high-power charging after the fine alignment being completed.

10. The urban air mobility of claim 9, wherein:

the control signal is received through frequency communication, and wherein the smart key includes at least one of a forward movement button, a backward movement button, a left movement button, a right movement button, and a stop button of the urban air mobility.

11. The urban air mobility of claim 9, wherein:

the UE further includes a user device, wherein the vehicle controller is further configured to;

transmit information related to wireless charging efficiency calculated during the low-power charging to the user device; and perform the fine alignment between the wireless power receiving pad and the wireless power transmitting pad based on the control signal received from the smart key in response to the transmitted information.

12. The urban air mobility of claim 9, wherein:

first power required for driving the charging device is received from the supply device during the low-power charging; and second power required for charging the battery is received from the supply device during the high-power charging, and wherein the second power is greater than the first power.

13. The urban air mobility of claim 9, wherein:

the user equipment (UE) further includes a user device; and the vehicle controller is further configured to:

analyze a beam pattern based on wireless power received from the supply device during the low-power charging;

transmit information related to the analyzed beam pattern to the user device; and perform the fine alignment between the wireless power receiving pad and the wireless power transmitting pad based on the control signal received from the smart key in response to the transmitted information.

14. The urban air mobility of claim 9, wherein:

the location information of the supply device is received from the supply device or an urban air mobility control center for managing the supply device via wireless communication in response to a charging request of the urban air mobility, wherein the location information includes GPS coordinate information of the supply device.

* * * * *